United States Patent

Kobayashi et al.

[11] Patent Number: 5,818,805
[45] Date of Patent: Oct. 6, 1998

[54] REPRODUCING APPARATUS USING AN INFORMATION RECORDING MEDIUM WHEREIN MULTI-BIT DIGITAL INFORMATION IS REPRESENTED BY A SHIFT AMOUNT OF A PIT EDGE

[75] Inventors: Seiji Kobayashi; Hiroshige Okamura, both of Kanagawa; Hisayuki Yamatsu; Toshiyuki Kashiwagi, both of Tokyo, all of Japan

[73] Assignee: Sony Corporation, Tokyo, Japan

[21] Appl. No.: 544,338

[22] Filed: Oct. 17, 1995

Related U.S. Application Data

[62] Division of Ser. No. 133,156, Oct. 13, 1993, abandoned.

[30] Foreign Application Priority Data

| Feb. 14, 1992 | [JP] | Japan | 4-59710 |
| Jul. 10, 1992 | [JP] | Japan | 4-207074 |

[51] Int. Cl.$^6$ ............................................. G11B 5/09
[52] U.S. Cl. ................................. 369/59; 369/47; 360/40
[58] Field of Search .................................. 369/59, 58, 47, 369/48, 60; 360/45, 51, 39, 40, 48

[56] References Cited

U.S. PATENT DOCUMENTS

| 4,774,522 | 9/1988 | Van Tongeren et al. | 346/1.1 |
| 4,809,251 | 2/1989 | Collomby et al. | 369/47 X |
| 4,873,680 | 10/1989 | Chung et al. | 369/69 |
| 4,932,017 | 6/1990 | Van Uijen | 369/48 |
| 5,034,940 | 7/1991 | Saito et al. | 369/44.34 |
| 5,063,546 | 11/1991 | Ito et al. | 369/32 |
| 5,206,853 | 4/1993 | Tanaka | 369/54 |
| 5,233,589 | 8/1993 | Saito et al. | 369/48 |
| 5,282,185 | 1/1994 | Mori et al. | 369/48 |
| 5,321,680 | 6/1994 | Bailey | 369/59 |
| 5,345,434 | 9/1994 | Ide et al. | 369/124 |
| 5,347,505 | 9/1994 | Moritsugu et al. | 369/59 |
| 5,404,345 | 4/1995 | Taki | 369/44.26 |
| 5,414,689 | 5/1995 | Naeda et al. | 369/59 |
| 5,418,770 | 5/1995 | Ide et al. | 369/116 |
| 5,450,381 | 9/1995 | Tsukamura et al. | 369/47 X |
| 5,517,481 | 5/1996 | Kobayashi | 369/124 |
| 5,524,103 | 6/1996 | Shimizu et al. | 369/58 X |
| 5,557,592 | 9/1996 | Kobayashi | 369/48 |
| 5,566,158 | 10/1996 | Kobayashi | 369/48 |

FOREIGN PATENT DOCUMENTS

| 0 540 345 A1 | 5/1993 | European Pat. Off. |
| 62-3445 | 1/1987 | Japan . |
| 63-48617 | 3/1988 | Japan . |
| 63-231733 | 9/1988 | Japan . |
| 63-298818 | 12/1988 | Japan . |
| 1-185839 | 7/1989 | Japan . |
| 1-263964 | 10/1989 | Japan . |
| 3-66735 | 10/1991 | Japan . |
| 3-288331 | 12/1991 | Japan | G11B 7/00 |
| 4-074317 | 3/1992 | Japan | G11B 7/00 |
| JP-A-04-366 426 | 12/1992 | Japan . |

*Primary Examiner*—Thang V. Tran
*Attorney, Agent, or Firm*—Limbach & Limbach

[57] ABSTRACT

Digital information is recorded with high density. Positions of a leading edge and a trailing edge of an information pit are shifted from a reference position indicated by a leading edge of a reference clock in a step-wise fashion in respond to digital data to be recorded.

15 Claims, 39 Drawing Sheets

FIG. 4
RECORDING
SIGNAL 
PITS { (LOW SENSITIVITY)
(HIGH SENSITIVITY) 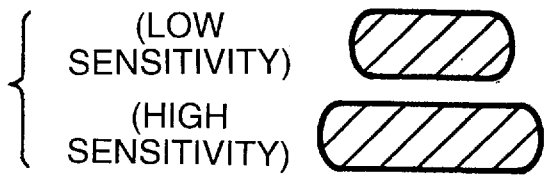

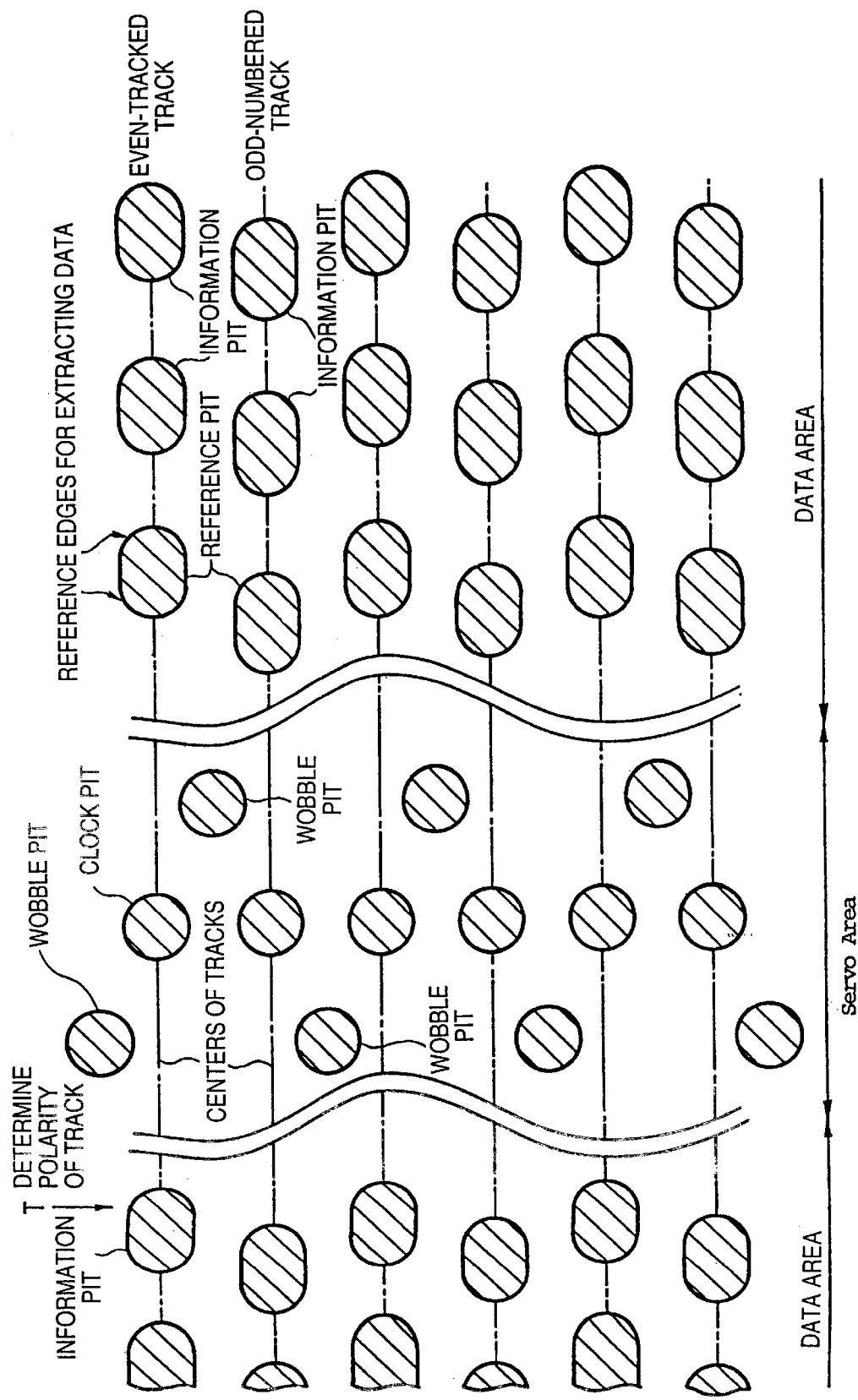

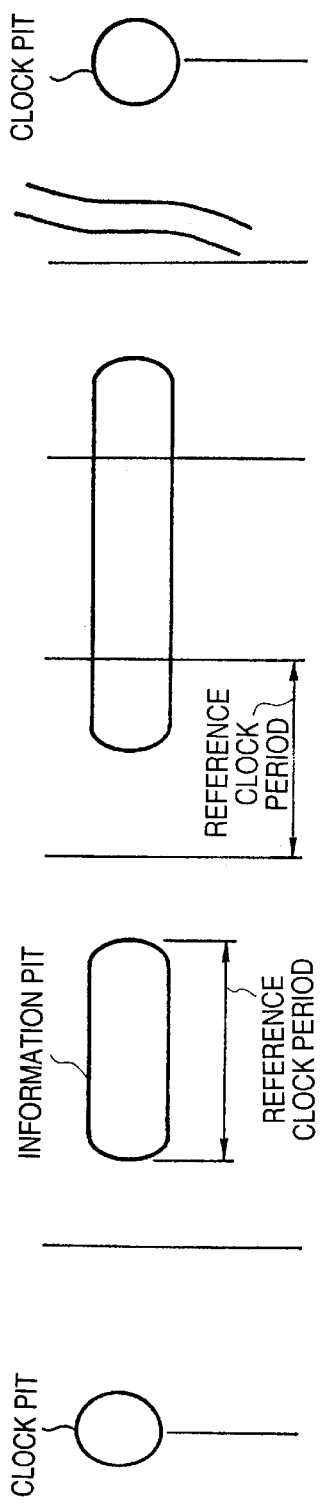
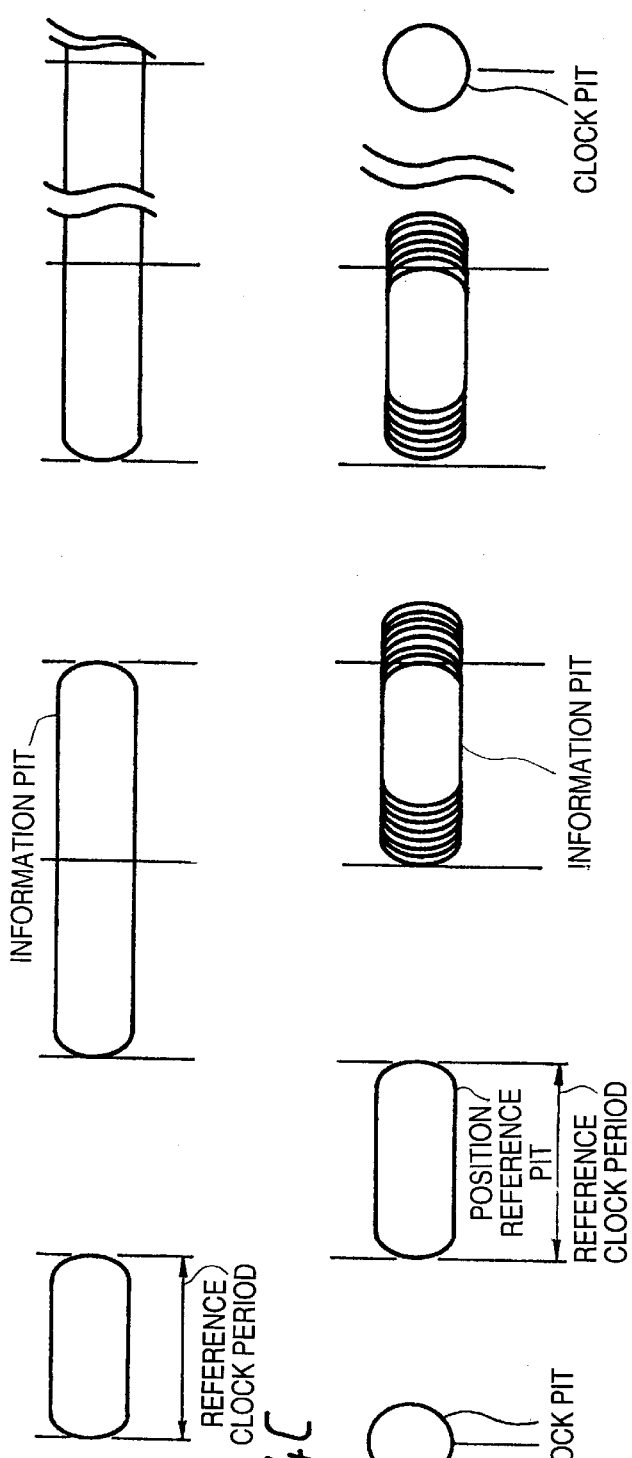
FIG. 14A (PRIOR ART)
FIG. 14B (PRIOR ART)
FIG. 14C

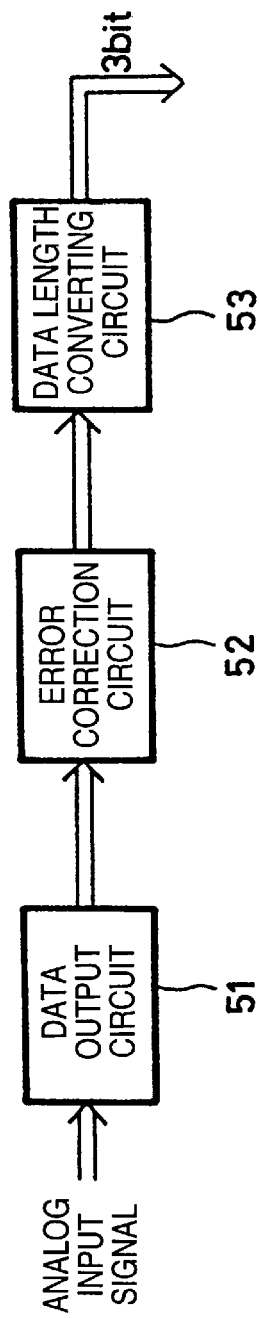
F I G. 15
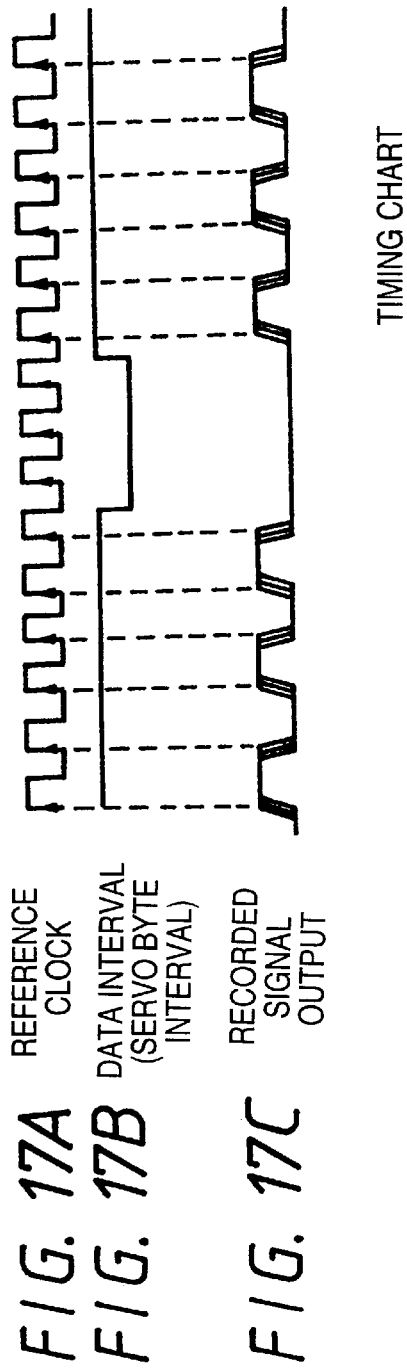
FIG. 17A REFERENCE CLOCK
FIG. 17B DATA INTERVAL (SERVO BYTE INTERVAL)
FIG. 17C RECORDED SIGNAL OUTPUT
TIMING CHART

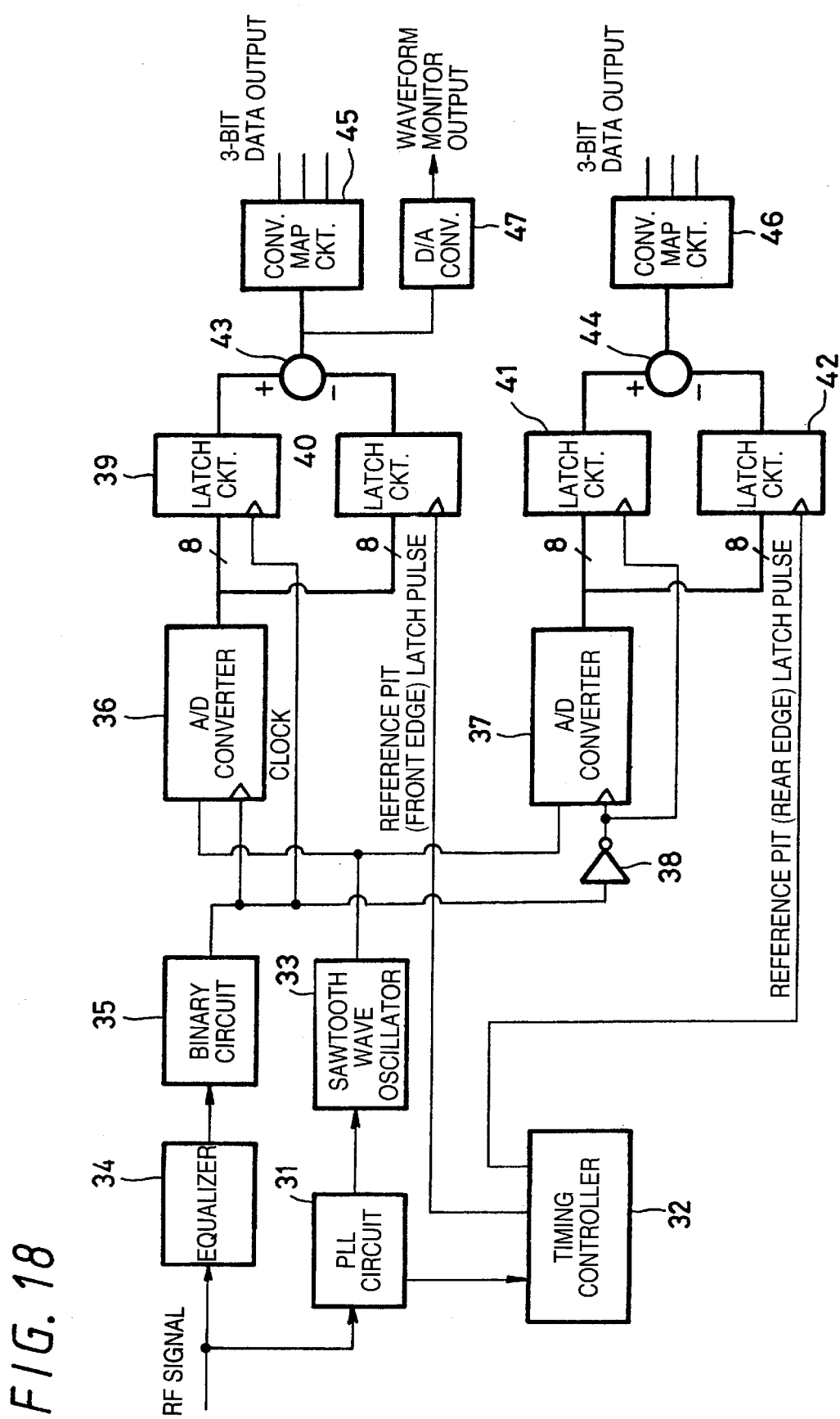

0.32 μm/bit 0.36 μm/bit 0.46 μm/bit

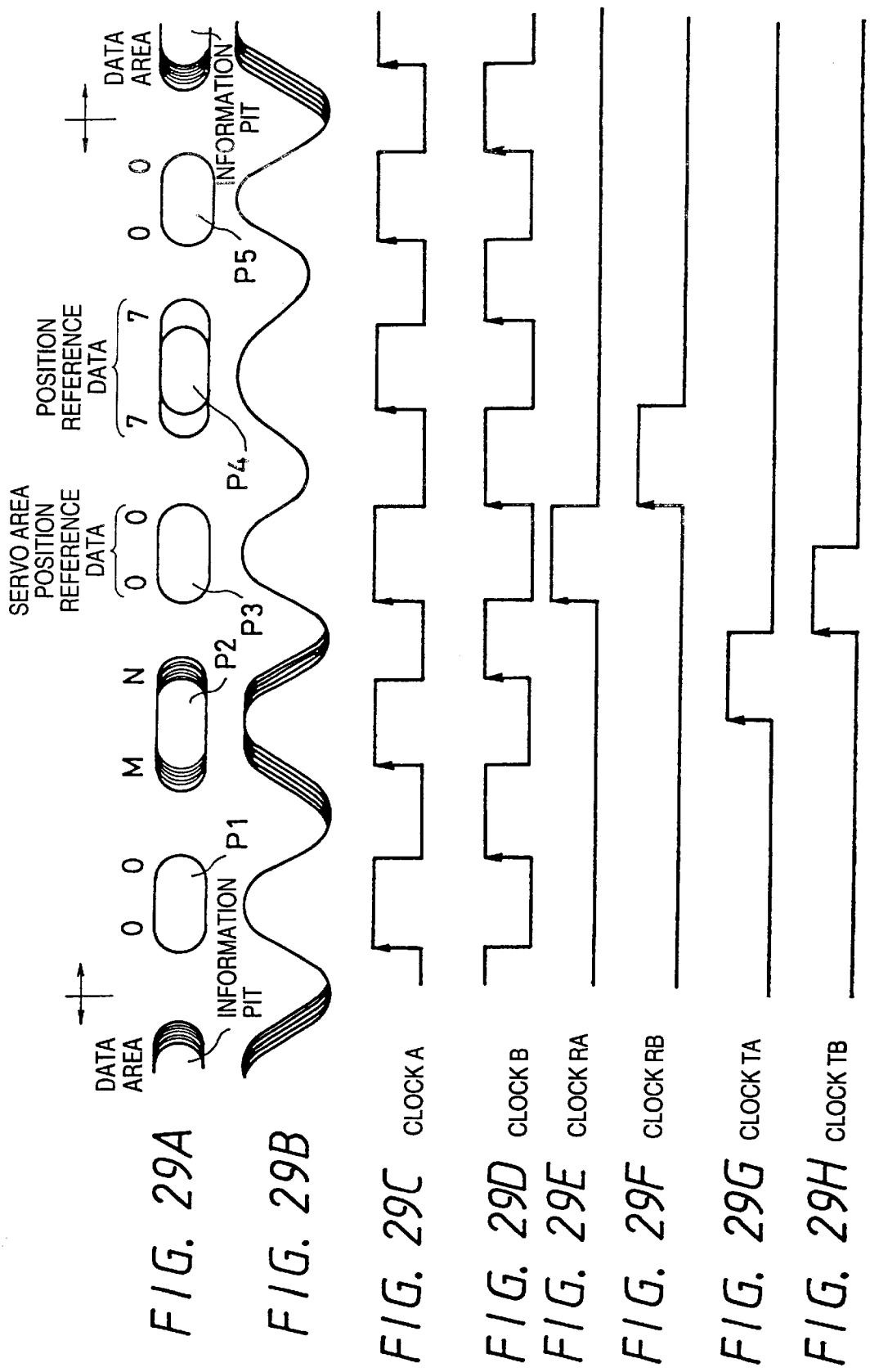

FIG. 33A  PIT TRAINS
FIG. 33B  RF SIGNAL
FIG. 33C  CLOCK A
FIG. 33D  CLOCK B
FIG. 33E  CLOCK A
FIG. 33F  CLOCK B

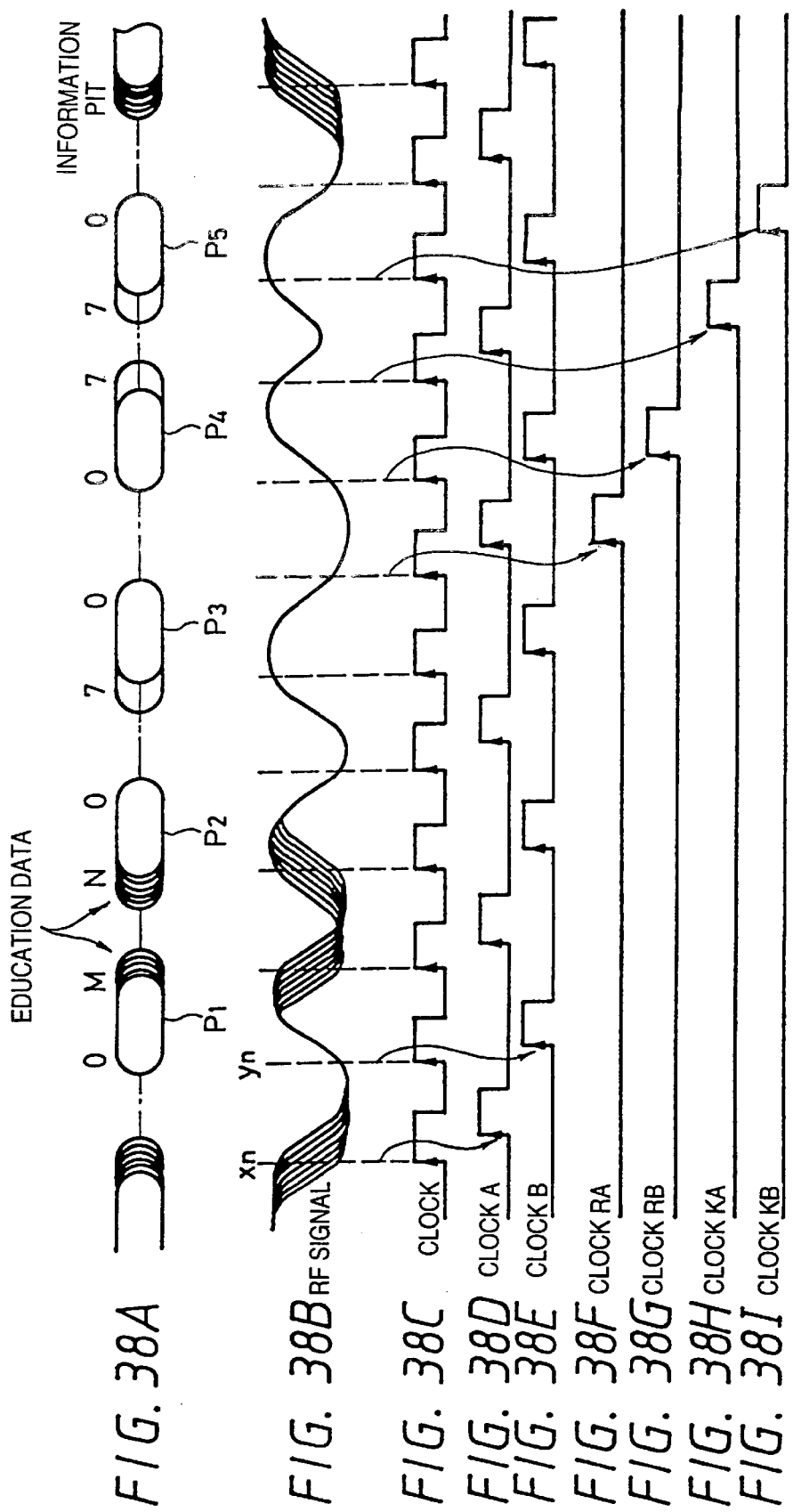

ENVELOPE OF
REPRODUCED SIGNAL

ENVELOPE OF
REPRODUCED SIGNAL

FIG. 44

| | Rn-1 & Rn | Rn-1 & Rn+1 | Rn-1 & Rn+2 | Rn & Rn+1 | Rn & Rn+2 | Rn+1 & Rn+2 |
|---|---|---|---|---|---|---|
| Rn-1 IS MAXIMUM VALUE | 1 | 1 | 1 | x | x | x |
| Rn IS MAXIMUM VALUE | 0 | x | x | 1 | 1 | x |
| Rn+1 IS MAXIMUM VALUE | x | 0 | x | 0 | x | 1 |
| Rn+2 IS MAXIMUM VALUE | x | x | 0 | x | 0 | 0 |
| Rn-1 IS MINIMUM VALUE | 0 | 0 | 0 | x | x | x |
| Rn IS MINIMUM VALUE | 1 | x | x | 0 | 0 | x |
| Rn+1 IS MINIMUM VALUE | x | 1 | x | 1 | x | 0 |
| Rn+2 IS MINIMUM VALUE | x | x | 1 | x | 1 | 1 |

TABLE USED TO DETECT MAXIMUM AND MINIMUM VALUES FROM SIGNAL SAB ON THE BASIS OF COMPARED RESULTS OF MAGNITUDE

REPRODUCING APPARATUS USING AN INFORMATION RECORDING MEDIUM WHEREIN MULTI-BIT DIGITAL INFORMATION IS REPRESENTED BY A SHIFT AMOUNT OF A PIT EDGE

This is a divisional of application Ser. No. 08/133,156, filed Oct. 13, 1993, now abandoned.

TECHNICAL FIELD

The present invention relates to an information recording medium in which multi-bit digital information is represented by the shift amount of the edge of a pit formed in an information recording medium, a recording apparatus, a reproducing apparatus, and a recording and reproducing apparatus for such a recording medium.

BACKGROUND ART

In conventional optical disks, a servo byte is periodically provided at a predetermined position of each track, and a clock pit for generating a reference clock and wobble pits for tracking are formed in each servo byte period. A reference clock is generated in response to the clock pits, and digital recording information is represented by a pit whose length corresponds to integral multiple of the period of the reference clock.

In a compact disc, for example, although there is no clock pit, digital recording information is also recorded by a pit whose length (in the range of 0.9 μm to 3.3 μm) corresponds to an integral multiple of the period of the reference.

As described above, in the conventional optical disk and the compact disc, a pit having a length corresponding to an integral multiple of the period of the reference clock is formed, and the digital recording information is represented by the length of the pit. However, when the digital recording information is represented by the length of the pit, it is difficult to increase the recording density.

When a 0.9 μm-long pit is recorded immediately after a 3.3 μm-long, the so-called heat storage effect results in the 0.9 μm-long pit being formed larger than expected because of heating of the disk when the 3.3 μm-long pit was recorded. As a result, the signal recorded on the disk is distorted and the read-out margin of the digital recording information reproduced from the disk is reduced.

SUMMARY OF THE INVENTION

In view of the above-mentioned situation, the purpose of the present invention is to increase the recording density of digital recording information recorded in a recording medium.

In an information recording apparatus according to the present invention, digital recording information is recorded such that the position of the leading or trailing edge of the information pit is shifted in a step-wise fashion relative to the respective leading or trailing edge of, for example, the reference clock pit or a reference position represented by the leading or trailing edge of a position reference pit or the like in response to digital recording information.

An information recording medium according to the present invention includes an information pit in which the edge position is changed in response to the digital recording information.

In the information recording medium according to the present invention, the phase of the information pit is shifted by 90 degrees between adjacent tracks.

In an information reproducing apparatus according to the present invention, the digital recording information is reproduced by detecting the shift amount of the leading or trailing edge of the information pit relative to the reference position.

The information recording apparatus according to the present invention records a position reference pit which indicates the reference position of the edge of the information pit.

In the information recording medium according to the present invention, the position reference pits indicating the reference position of the edge of the information pit are provided in a predetermined ratio to the information pits.

In the information reproducing apparatus according to the present invention, a correction circuit corrects the detected position of the edge of the information pit according to the detected position of the edge of the position reference pit.

In the information recording medium according to the present invention, wobble pits used for tracking control are located so that one wobble pit is made common to adjacent tracks.

In the information recording and reproducing apparatus according to the present invention, the polarity of the tracking performed in response to the wobble pit is switched between odd-numbered tracks and even-numbered tracks.

In the information recording apparatus according to the present invention, the information pits are recorded such that their phase is shifted by 90 degrees between adjacent tracks.

In the information reproducing apparatus according to the present invention, which operates with an information recording medium in which the position of the front or rear edge of an information pit is shifted in a step-wise fashion from a predetermined reference position to represent digital recording information, a clock synchronized in phase with the reference position is generated, a shift in the level of the signal reproduced from the information recording medium resulting from the edge is detected and the position of the edge is judged from the detected level shift.

In the information reproducing apparatus according to the present invention, which operates with an information recording medium in which the position of the front or rear edge of an information pit is shifted in a step-wise fashion from a predetermined reference position to represent digital recording information, the position of the edge is judged on the basis of an information point determined by the level of the signal reproduced from the information recording medium in response to two adjacent edges located at predetermined positions.

Reference points for judging the information point are mapped in a memory, and the information point can be judged as the point corresponding to the closest of the mapped reference points.

Further, this mapping can be carried out by reproducing education pits formed in the information recording medium.

Additional reference points for mapping in the memory can be calculated by interpolation using the reference points determined by reproducing the education pits.

With respect to each education pit used for the mapping, a predetermined one can be selected for mapping from several education pits reproduced from the information recording medium to prevent defective education pits from reducing the accuracy of reproduction.

The reference points can be stored at a storage point in the memory determined by an address corresponding to the reproduced level of the education pit.

The reference point mapped to the storage point in the memory determined by the address corresponding to the reproduced level of each education pit can additionally be mapped to those others of the storage points in the memory that are closest to the storage point determined by the address corresponding to the reproduced level of the education pit.

Further, the memory can be formed of a RAM.

The signal reproduced from the information recording medium in response to a reference pit that has edges located at a shift position at which the shift amount is smallest can be subtracted from the signal reproduced in response to the information pits.

Furthermore, signals reproduced from the information recording medium in response to reference pits having edges located at the shift positions at which the shift amount is smallest and having edges located at the shift positions at which the shift amount is largest can be subtracted from the signal reproduced in response to the information pits.

In the information recording medium according to the present invention, in which the position of a front or rear edge of an information pit is shifted in a step-wise fashion from a predetermined reference position to represent digital recording information, there are also formed education pits each representing education data used to generate a reference point that is used to judge an information point according to the level of the signal reproduced from the information recording medium when two adjacent edges are located at predetermined positions.

The education data represented by the education pit can be formed in the edge of the education pit remote from an information pit.

A reference pit having two edges located at a shift position in which the shift amount is smallest can be recorded at a predetermined position removed from the information pits.

A reference pit having two edges located at a shift position in which the shift amount is largest can be recorded at a predetermined position removed from the information pits.

Furthermore, reference pits having two edges located at the shift position in which the shift amount is smallest and two edges located at the shift position in which the shift amount is largest can be recorded at predetermined positions removed from the information pits.

BRIEF DESCRIPTION OF THE DRAWINGS

FIG. 4 shows the effect of variations in the sensitivity of the optical disk on the recorded length on an information pit.

FIG. 13 shows the arrangement of pits near the servo area of the optical disk according to the present invention.

FIG. 14 shows the differences between the information pits according to the present invention (FIG. 14C) and the pits of known information recording media (FIGS. 14A and 14B).

FIG. 15 is a block diagram showing the arrangement of part of an embodiment of an information recording apparatus according to the present invention.

FIGS. 17A–17C are timing charts illustrating the operation of the embodiment shown in FIG. 16.

FIG. 18 is a block diagram showing the arrangement of an embodiment of an information reproducing apparatus according to the present invention.

FIGS. 29A–29H are timing charts illustrating the operation of the servo area in the embodiment of FIG. 24.

FIGS. 38A–38I are timing charts illustrating the operation of the embodiment shown in FIG. 37.

FIG. 44 is table illustrating the logical operations performed by the controller shown in FIG. 43.

DETAILED DESCRIPTION OF THE INVENTION

Figure 1:
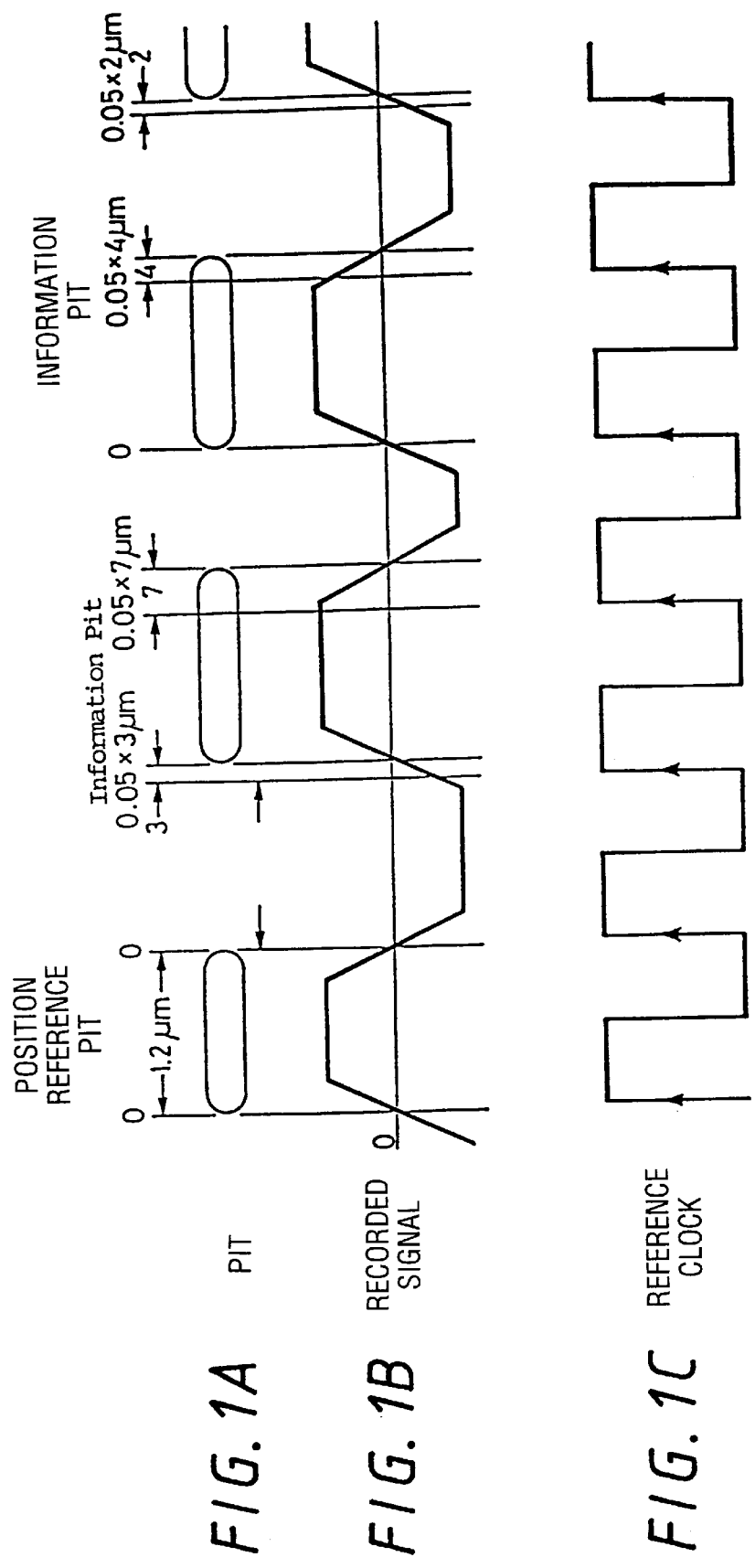
FIGS. 1A–1C show the principle by which digital recording information is represented by the position of the edge of an information pit according to the present invention.

Embodiments of the present invention will now be described. FIG. 1 shows the recording principle of the present invention. As illustrated, according to the present invention, the position of the front edge, or the rear edge, or both the front edge and the rear edge of an information pit is shifted in a step-wise fashion relative to the position of a reference edge in response to the digital recording information (the positions of both the front edge and the rear edge are shifted in this embodiment).

More specifically, the timing (i.e., the zero-crossing time) of the edge of the recorded signal shown in FIG. 1B is delayed or advanced in a step-wise fashion by a predetermined time relative to the time corresponding to the front edge of the reference clock shown in FIG. 1C in response to the digital recording information. In this embodiment, the timing of the edge of the recording signal is delayed so that the position of the edge of the pit is moved to the right relative to the reference position shown in the figure. When the timing of the edge of the recording signal is advanced, the position of the edge of the pit is moved to the left in the figure.

In the example shown, the shift in the position of each edge represents 3-bit digital recording information (i.e., values ranging from [0] to [7]). Each edge is formed at the reference position when the digital recording information is [0], and each edge is shifted by a distance corresponding to one unit of delay time (one step) when the digital recording information is [1], each edge is shifted by a distance corresponding to two units of the delay time (2 steps) when the digital recording information is [2], and each edge is shifted by a distance corresponding to three units of the delay time (3 steps) when the digital recording information is [3]. In a like manner, when the digital recording information is [7], the edge is shifted by a distance corresponding to seven units of the delay time (7 steps).

When the digital recording information is recorded as described above, information pits are formed in the optical disk as shown in FIG. 1A. The information pit can be formed as a physically concave or convex portion, and can also be formed by changing a characteristic (e.g., reflectivity or transmittance, etc.) of the information recording medium at the information pit relative to the characteristic of the rest of the information recording medium. In the example shown, digital recording information values of [3] and [7] are respectively represented by the shift of the positions of the front edge and the rear edge of the first information pit following the position reference pit (the position reference pit will be described below), and values of [0] and [4] are respectively represented by the shift of the positions of the front edge and the rear edge of the next information pit. Assuming that the distance on the information recording medium corresponding to the unit of the delay time (one step) of the recording signal is 0.05 $\mu$m, then the respective edges are shifted to the right by 3×0.05 $\mu$m, 7×0.05 $\mu$m, 0×0.05 $\mu$m and 4×0.05 $\mu$m from the reference position. When neither the front nor the rear edge is delayed, the distance on the optical disk corresponding to one period of the reference clock is set to be 1.2 $\mu$m.

Figure 2:
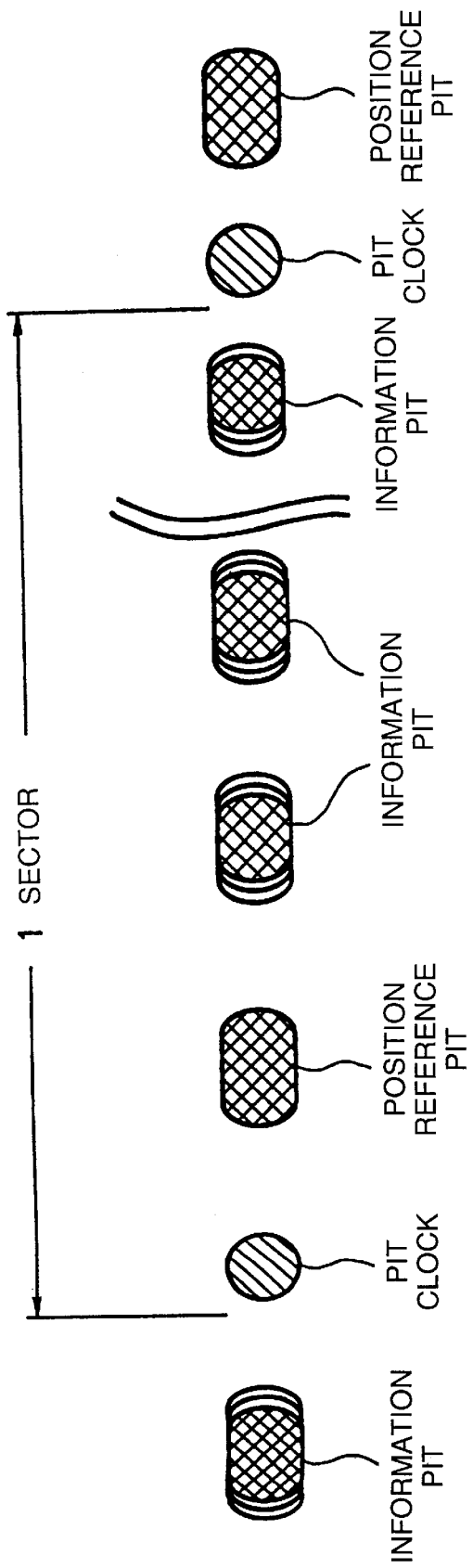
FIG. 2 shows the information recording format of one sector of the information recording medium according to the present invention.

When the edge of the information pit is shifted relative to the reference position to represent the digital recording information as described above, the reference position of the edge must be clearly defined. To this end, as shown in FIG. 2, a clock pit (PLL pit) is periodically recorded in the information recording medium. For example, each rotation of the optical disk is segmented into 4200 sectors, one servo area is provided in each sector, and one clock pit is recorded in each servo area.

When the digital recording information is recorded, the clock pit, which is formed when the disk is manufactured, is reproduced and the reference clock (FIG. 1C) is generated in synchronism with this pit. The reference position of the edge is determined on the basis of the reference clock. The front edge of the reference clock is used as the reference position of the edge of the information pit in this embodiment. Plural information pits are formed between each clock pit and the next clock pit.

Figure 3:
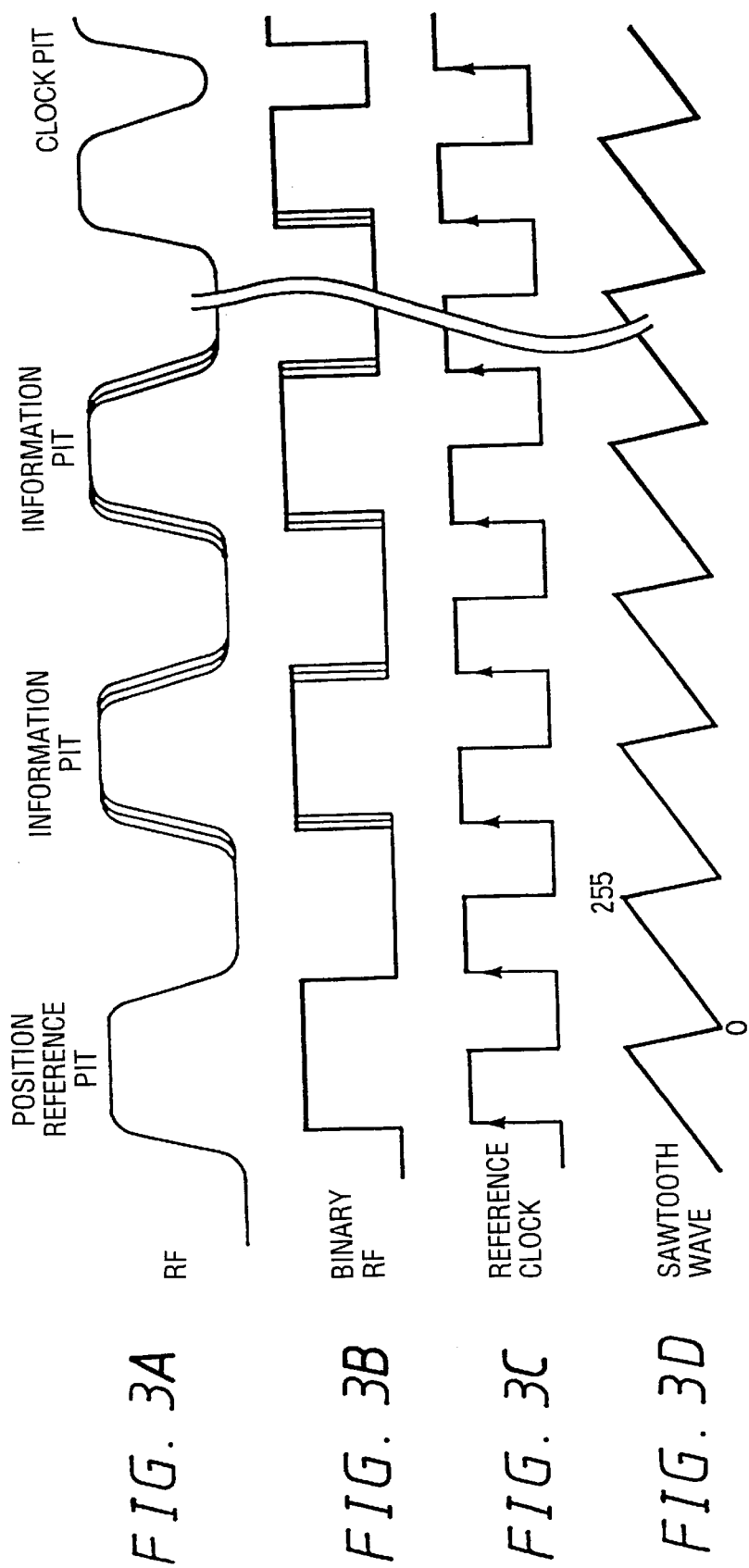
FIGS. 3A–3D show the principle of how digital recording information is read out from the position of the edge of an information pit according to the present invention.

FIG. 3 shows the principle of the reproducing mode. Upon playback, the RF signal shown in FIG. 3A is obtained by reproducing the optical disk in which digital recording information is recorded in the manner shown in FIGS. 1 and 2. The RF signal is amplified and converted into a binary signal, resulting in the binary RF signal shown in FIG. 3B. The signal portion reproduced in response to the clock pit is separated from the binary RF signal and is used to synchronize the reference clock shown in FIG. 3C. Further, the sawtooth wave signal (which might be a triangular wave signal) shown in FIG. 3D is generated in synchronism with the reference clock.

The sawtooth wave signal shown in FIG. 3D reaches its maximum level [255] immediately before the rear edge of the reference clock, suddenly falls to its minimum level after the rear edge, and then linearly increases again to the maximum level. A level can be judged to one of 256 steps using this sawtooth wave signal. The levels of the sawtooth wave signal (FIG. 3D) at the timing of the front edge and at the timing of the rear edge of the binary RF signal (FIG. 3B) are detected. These levels represent the positions of the edges of the information pit on an arbitrary scale. Also, the level of the sawtooth wave signal (FIG. 3D) at the timing of the front edge of the reference clock (FIG. 3C) is detected. This level represents the reference position of the edges of the information pit on the same arbitrary scale. Then, the shifts relative to the reference position of the edges of the information pit (corresponding to the digital recording information) can be detected using the differences in levels.

If the sensitivity of the optical disk varies with time, or the power of the recording laser varies with time, then the positions of the edges of the pits formed in the optical disk also vary. FIG. 4 shows this situation. More specifically, when the intensity of the recording laser remains constant, but the sensitivity of the optical disk is low, then the length of the pit is less than when the sensitivity is high. Also, when the sensitivity of the optical disk remains constant, but the power of the recording laser varies, then a similar variation in the length of the pit occurs.

If such variations in disk sensitivity or recording laser power occur, then the position of the above-mentioned edges is no longer accurately defined. This makes it more difficult to record the digital recording information accurately. Therefore, in this embodiment, a position reference pit is periodically recorded in addition to the clock pit. In this embodiment, the position reference pit is formed immediately after each clock pit (i.e., one position reference pit is formed in each sector) and plural information pits are formed following the position reference pit. Both the front edge and the rear edge of the position reference pit are always located at the reference position (i.e., at the position corresponding to the front edge of the reference clock).

Figure 5:
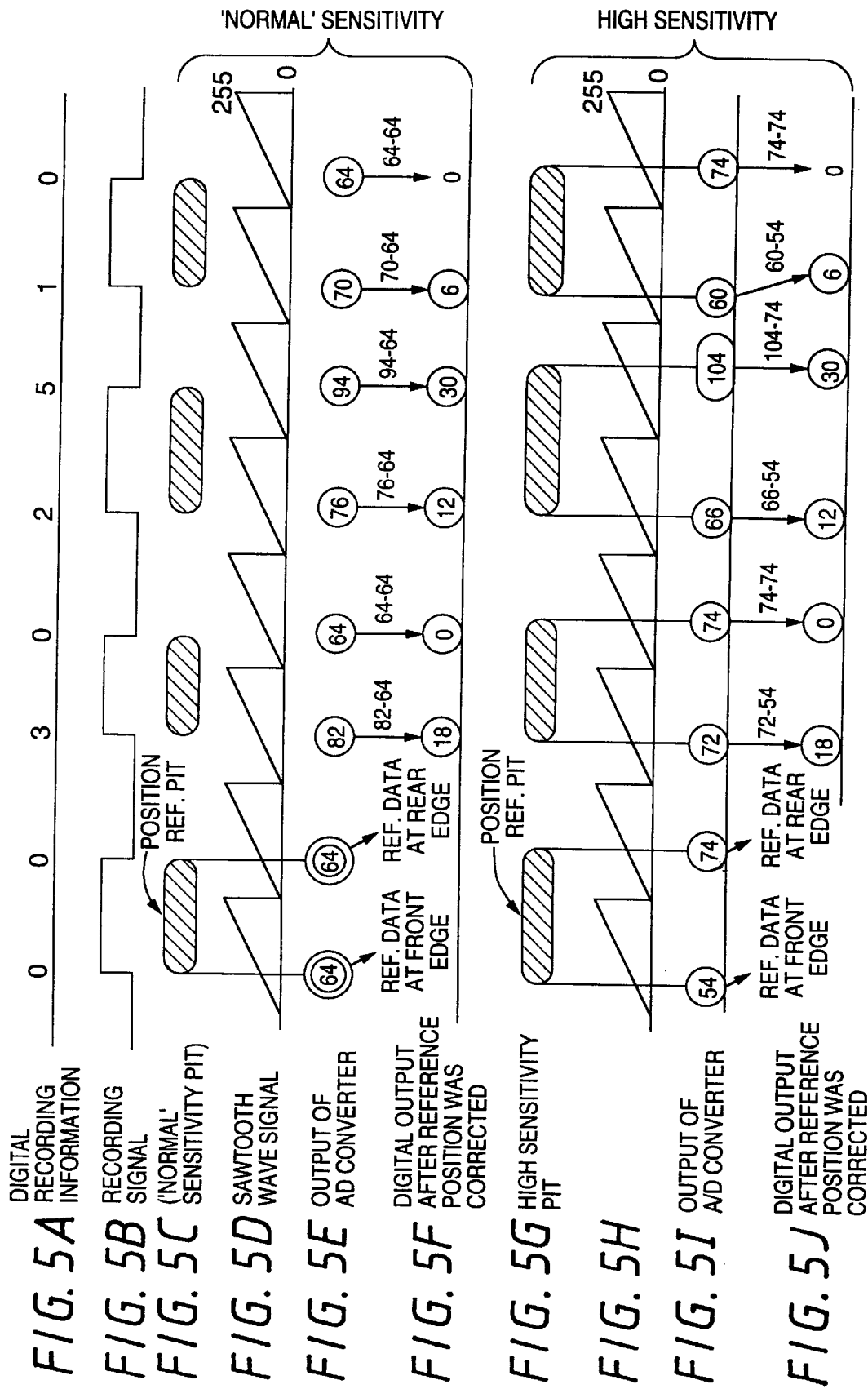
FIGS. 5A–5J show the action of the position reference pit according to the present invention.

The action of the position reference pit will be described with reference to FIG. 5. As shown in FIG. 5A, the first pit is the position reference pit, and therefore both edges are formed in the positions representing digital recording information of [0]. The positions of the front edges and rear edges of the three information pits following the position reference pit represent digital recording information of [3] and [0], [2] and [5], and [1] and [0], respectively. Therefore, assuming now that the optical disk has "normal" sensitivity, the recording signal shown in FIG. 5B results in the position reference pit and the information pits formed on the optical disk as shown in FIG. 5C.

Upon playback, when the timings of the front and rear edges of each pit are detected, and the levels of the sawtooth wave signal shown in FIG. 5D at the timings of the edges are determined, the levels corresponding to the timings of the front and rear edges of the position reference pit are both [64]. Also, when the timings of the front and rear edges of three information pits are detected and the levels of the sawtooth wave signals at the timings of the edges are determined, the levels determined are respectively [82] and [64], [76] and [94], and [70] and [64] as shown in FIG. 5E. To calculate the shift amount relative to the reference position represented by these levels, the level of the sawtooth wave signal at the timing of the front edge of the reference clock for the respective reference and information pits is determined and this level is subtracted as described above. The level of the sawtooth wave signal at the timing of the front edge of the reference clock is the same as the level of the sawtooth wave at the timing of the edges of the position reference pit. Accordingly, instead of reading out the level of the sawtooth wave signal at the timing of the edge of the reference clock for every pit, the level of the sawtooth wave signal at the timing of the front and rear edges of the position reference pit can be. This is a second beneficial effect of the position reference pit that is achieved in addition to the sensitivity correcting action, a first beneficial effect that will be in more detail described below.

In this example, by subtracting the values [64] and [64] of the sawtooth wave signal at the timing of the edges of the position reference pit from the values shown in FIG. 5E, i.e., [82] and [64], [76] and [94], and [70] and [64], differences of [18] and [0], [12] and [30], [6] and [0] are obtained. These differences respectively indicate the shift amount, as shown in FIG. 5F. Among these differences, the value [6] corresponds to the above-mentioned unit delay time, so that recording information values of [3] and [0], [2] and [5] and [1] and [0] are respectively obtained by dividing these differences by [6]. These recording information values are the same as the original recording information values shown in FIG. 5A.

When the sensitivity of the optical disk is higher than "normal," then, as shown in FIG. 5G, the lengths of the reference pit and the information pits formed in response to the recording signal shown in FIG. 5B are increased compared with the lengths of the pits formed in the disk of "normal" sensitivity shown in FIG. 5C. The variation in sensitivity is substantially constant throughout each optical disk regardless of the variation between optical disks. Even if a local variation occurs in one optical disk, then the variation in sensitivity can be regarded as being substantially constant between consecutive reference pits (i.e., within one sector).

In this example, it is assumed that the level of the sawtooth wave signal (shown in FIG. 5I) at the timing of the front edge of the position reference pit (shown in FIG. 5H) is reduced by [10] compared with that at the timing of the front edge of the reference pit formed on the disk of "normal" sensitivity shown in FIG. 5C. It is also assumed that the level of the sawtooth wave signal at the timing of the rear edge of the position reference pit is increased by [10] compared with that at the timing of the rear edge of the reference pit formed in the disk of "normal" sensitivity. Consequently, the levels of the sawtooth wave signal at the timings of the front edge and the rear edge of the first information pit respectively become [54] (=64−10) and [74] (=64+10). Similarly, the levels of the sawtooth wave signal at the timings of the front edge and the rear edge of each information pit are respectively reduced and increased by [10] from levels of the sawtooth wave signal obtained when reproducing the disk of "normal" sensitivity. In the example shown, the levels of the sawtooth wave signal (FIG. 5H) at the timings of the front edge and the rear edge of the information pits (FIG. 5G) are respectively [72] (=82−10) and [74] (=64+10), [66] (=76−10) and [104] (=94+100, [60] (=70−10) and [74] (=64+10), as shown in FIG. 5I.

Accordingly, by subtracting the reference pit levels [54] and [74] from these information pit levels [72] and [74], [66] and [104] and [60] and [74], differences of [18] and [0], [12] and [30], and [6] and [0] are respectively obtained, as shown in FIG. 5J. These differences are the same as those obtained when the disk of "normal" sensitivity shown in FIG. 5F is reproduced. This is the first beneficial effect achieved by the position reference pit.

While the present invention has been described so far using the example of the sensitivity of the disk being too high, when the sensitivity is too low, the level of the sawtooth wave corresponding to position of the edge of the information pit is reduced by the same amount as that of the position of the edge of the position reference pit so that, as when the sensitivity is too high, the same digital recording information values as those obtained by reproducing a disk of "normal" sensitivity can be reproduced.

More specifically, since the position reference pit is formed as described above, the value of the sawtooth wave signal need not be read at the timing of the reference clock at each pit. Also, even when the sensitivity of the disk differs at different locations on the disk, or similar variations occur, the reference pit enables the digital recording information still to be recorded and reproduced correctly.

Figure 6:
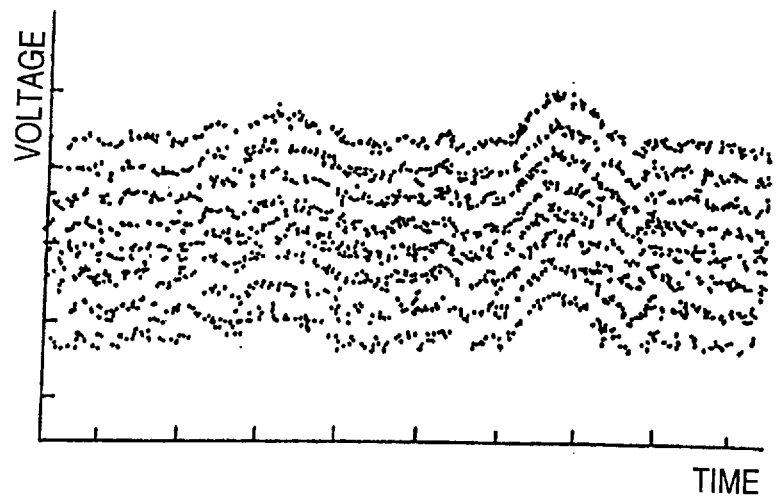
FIG. 6 shows the output obtained when correction using the position reference pit of the present invention is not carried out.
Figure 7:
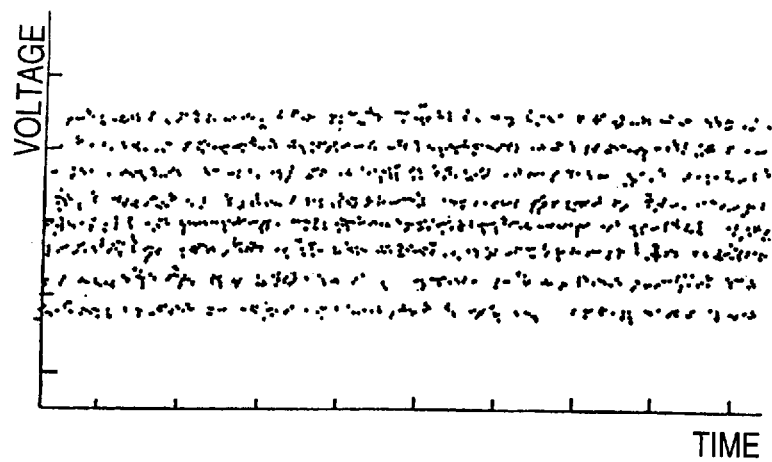
FIG. 7 shows the output obtained when correction using the position reference pit of the present invention is carried out.

FIGS. 6 and 7 are diagrams for explaining the beneficial effects achieved by the correction provided by using the position reference pit. In both figures, the abscissa represents time and the ordinate represents voltage. The voltage on the ordinate represents the digital recording information values from [0] to [7] shown in FIG. 1 in terms of voltage. That is, when the shift amount (which can have any value between [0] and [7]) of the edge at a certain time (i.e., at a predetermined position on the abscissa) from the reference position is [0], the shift amount of this edge is represented by the lowest voltage. When the shift amount is [7], then the shift amount of the edge is represented by the highest voltage. Digital recording information values that are expressed by the edges of successively reproduced information pits are represented by the different voltage levels. These waveforms are obtained by monitoring the output of the D/A converter 47 in FIG. 18, as will be described in more detail below.

FIG. 6 shows the situation when correction is not carried out using the position reference pit. In the case illustrated in this figure, points that should be arranged in a horizontal line indicating a constant voltage are considerably shifted in the ordinate direction for every recording information value between [0] and [7]. This means that, for an edge that nominally represents the data value of [5], its shift amount from the reference position may increase (e.g., may change towards the shift amount (voltage) that nominally represents the data value of [7]) or may decrease (e.g., may change towards the shift amount (voltage) that nominally represents the data value of [3]), depending on the circumstances. In other words, the shift amount changes. To determine whether a shift amount represents a data value of any one of [0] to [7], an intermediate voltage between the voltage (representing a shift amount) indicating one data value (e.g., [5]) and the voltage (representing a shift amount) indicating an adjacent data value (e.g., [6]) must be selected to be a threshold value, and it must be determined whether or not the voltage is larger or smaller than the threshold value. However, when voltages that indicate the respective recording information values fluctuate as shown in FIG. 6, it is impossible to determine what recording information value is represented by the shift amount (e.g., whether the recording information value is [5] or [6]) when the determination is based on a fixed predetermined threshold voltage.

FIG. 7 shows the situation when correction using the position reference pit is carried out. In this case, it is to be appreciated that the voltages (representing the shift amounts) representing the respective data values are constant. Accordingly, in this case, respective recording information values can be identified with ease using a predetermined threshold value.

Figure 8:
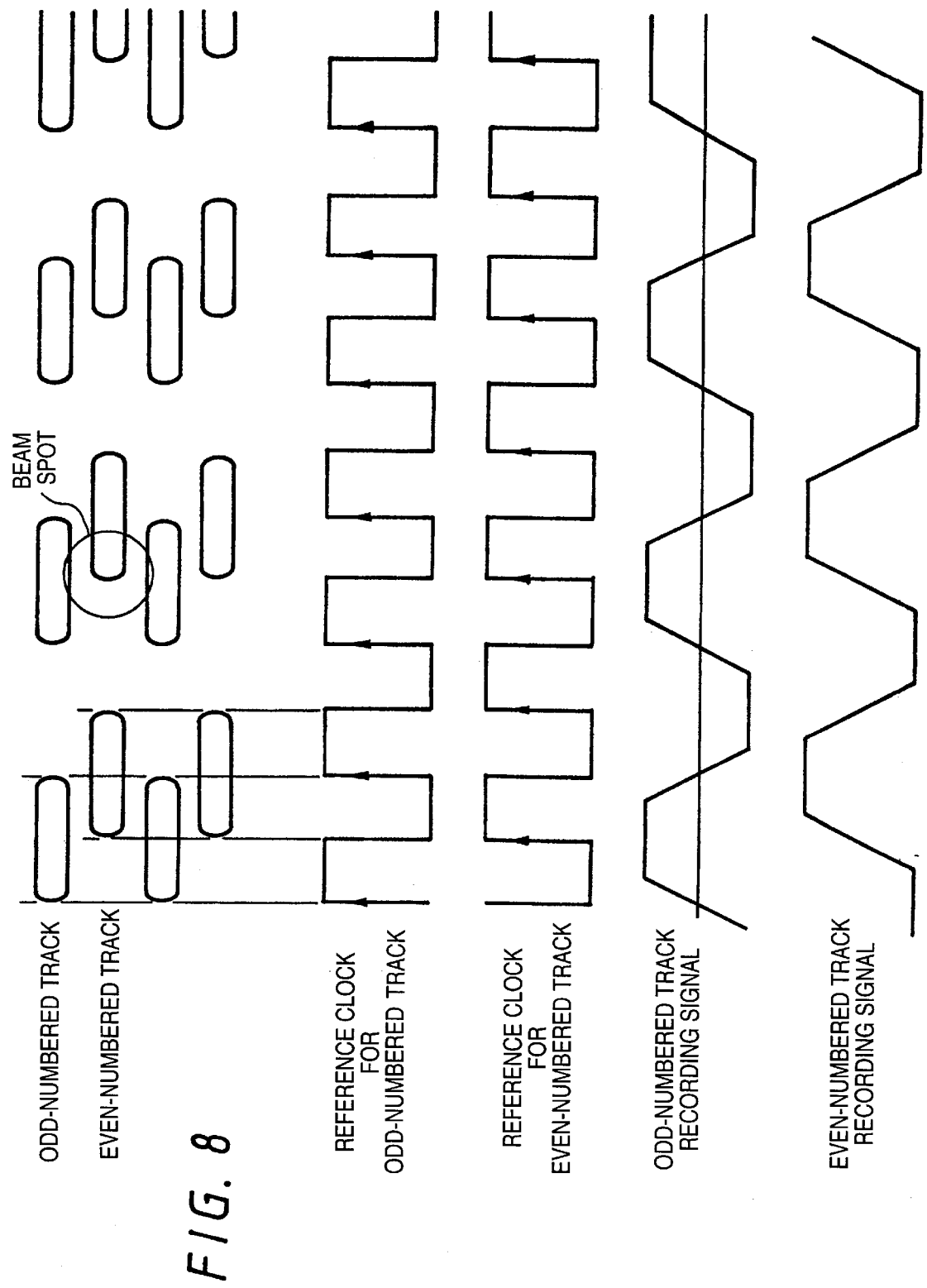
FIG. 8 shows how the phase of the information pits is shifted by 90 degrees between adjacent tracks according to the present invention.

FIG. 8 shows the preferred relationship between the pits (position reference pit and information pits) in adjacent tracks. In the case of the constant angular velocity (CAV) disk shown in the figure, the phases (i.e., the phases corresponding to a recording information value of [0]) of the pits in adjacent tracks (i.e., in an odd-numbered track and the adjacent even-numbered track) are shifted by 90 degrees. In other words, the phase of the recording signal when the recording information value is [0] is shifted by 90 degrees between adjacent tracks. This also means that the phase of the reference clock in the odd-numbered track is shifted relative to the phase of the reference clock in the even-numbered track by 180 degrees. With the above-mentioned arrangement, when the edge of the position reference pit or information pit in one track is reproduced by one beam spot, the edges of the pits in the adjacent tracks are located outside the beam spot so that crosstalk between the edges of the pits in the adjacent tracks is reduced. This enables the track pitch to be reduced and a higher density recording to be realized.

Figure 9:
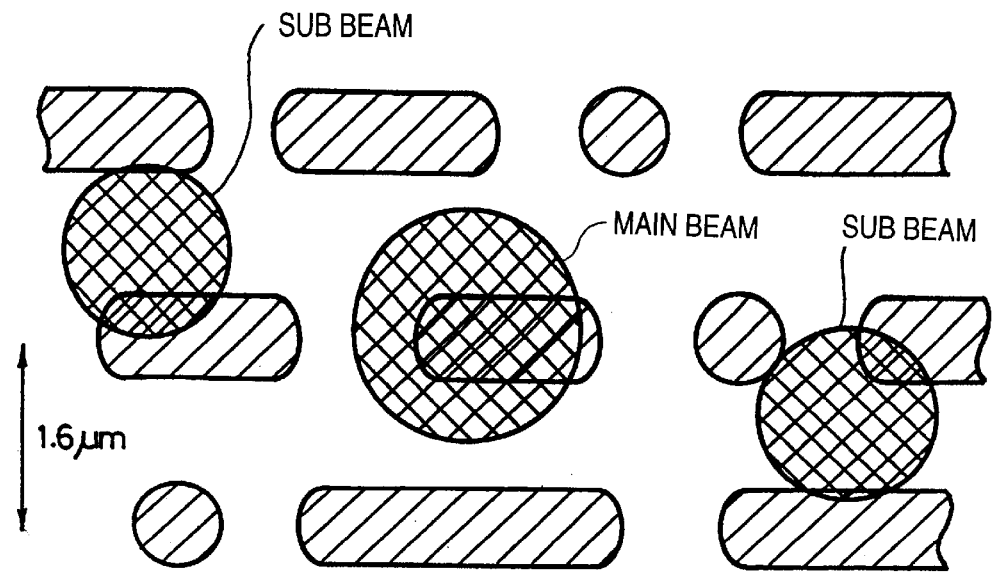
FIG. 9 shows how tracking is performed by a 3-spot system.
Figure 10:
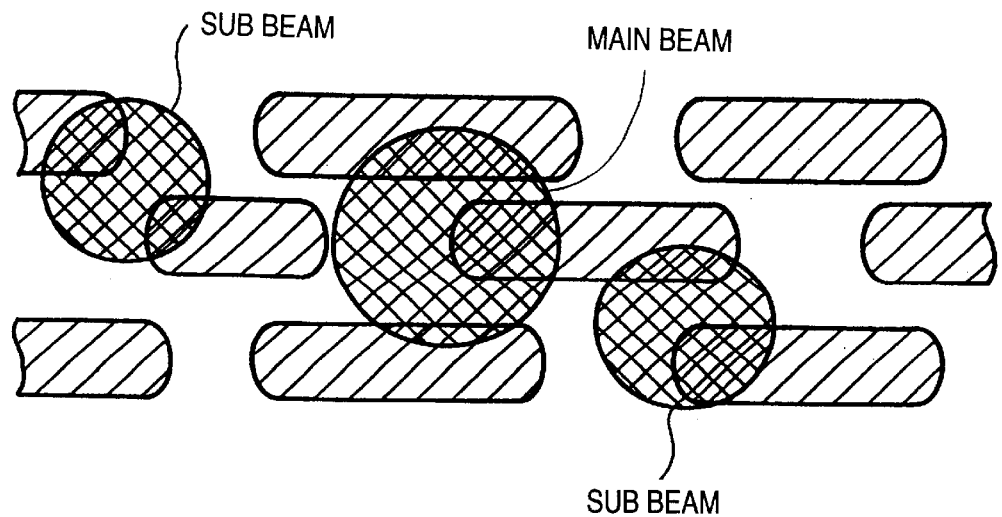
FIG. 10 shows the effect of reducing the track pitch on the tracking performed by a 3-spot system.

The method of tracking the recording will be described next. One known tracking method is the so-called three-spot (three-beam) method. According to this method, as shown in FIG. 9, two sub beams of laser light are provided, one on each side of the main beam that is inherently provided to reproduce the recording information on the disk. The sub beams respectively illuminate the lands at the right and left edges of the track, and reflected beams from the two sub beams are detected by respective photodetectors. A tracking error signal can be generated in response to the difference between the outputs of the photo detectors. However when the track pitch is reduced, as shown in FIG. 10, each sub beam reads out the information recorded in the adjacent track, and a tracking error signal can no longer be reliably generated.

Figure 11:
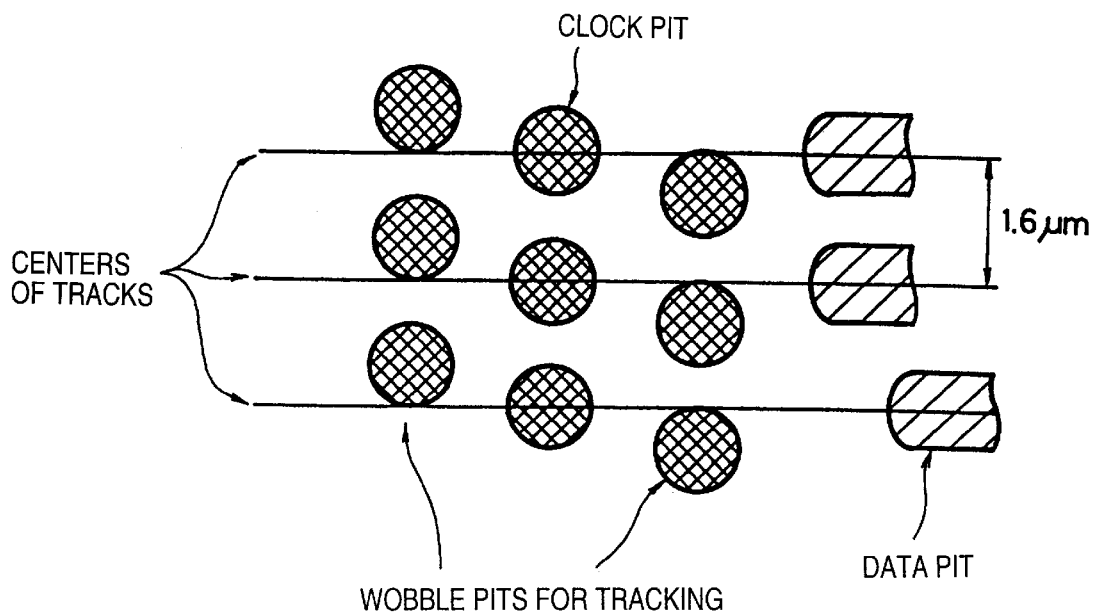
FIG. 11 shows how tracking is performed using wobble pits.
Figure 12:
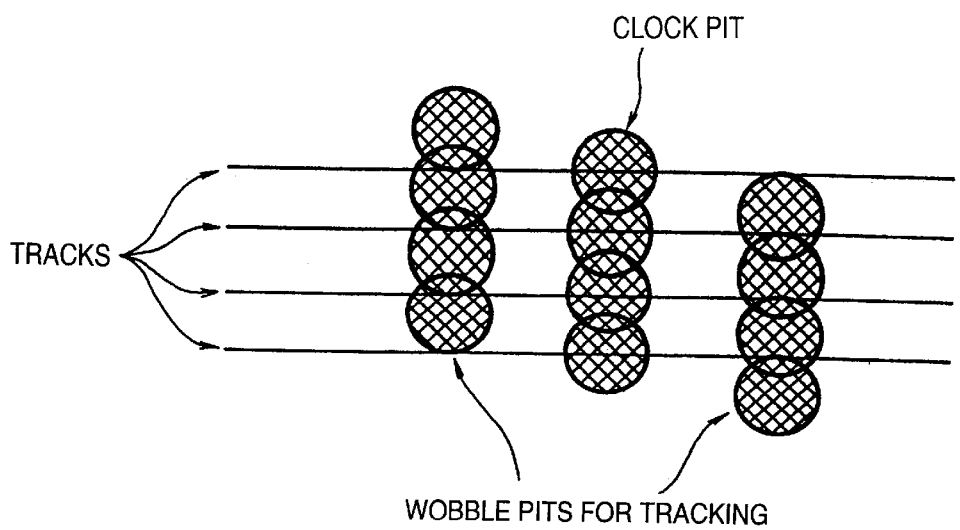
FIG. 12 shows the effect of reducing the track pitch on the tracking performed using wobble pits.

Some optical disks provide for tracking using a so-called sample servo system. Such disks include wobble pits located along the track in positions slightly displaced to the right and the left of the center of the track, as shown in FIG. 11. A tracking error signal can be generated from the level difference between the signals obtained by reproducing the two wobble pits. However, if the track pitch is reduced, as shown in FIG. 12, the wobble pits in adjacent tracks interfere with each other so that the correct tracking error signal cannot be generated.

Therefore, the tracking method according to the invention basically adopts the sample servo system shown in FIG. 11, but, as shown in FIG. 13, provides one clock pit located on the center line of the track in the servo area, together with two wobble pits displaced from, and on opposite sides of, the center line of the track, and located on opposite sides of the clock pit in the track direction. The wobble pits are preformed in the information recording medium before the digital recording information is recorded as, for example, physically concave or convex portions. The wobble pits are arranged so that they can be used commonly between adjacent tracks. In other words, each wobble pit is displaced from the center line of the track to a position half-way between the track and the adjacent track. Each wobble pit serves to generate the right tracking signal and then the left tracking signal on consecutive revolutions of the disk. With this arrangement, a tracking error signal can be generated even when the track pitch is reduced.

When one wobble pit is used to generate both the right and the left tracking signals, the polarity of the tracking servo must be inverted between the odd-numbered tracks and the even-numbered tracks. An embodiment employing this technique will be described below with reference to FIG. 19.

When the phase of the position reference pit and the information pits are shifted 90 degrees between the odd-numbered track and even-numbered track, as shown in FIG. 13, the position of the last information pit in either the even-numbered track or the odd-numbered track (the even-numbered track in this example) is displaced backwards relative to the other track (the odd-numbered track in this example). When the reproduced signal resulting from this arrangement is observed on the time axis, the last information pit appears in the even-numbered track with a delay relative to that in the odd-numbered track. Alternatively, the position reference pit located immediately after the clock in the even-numbered track appears with a delay relative to the position reference pit in the odd-numbered track. Accordingly, whether a track is an odd-numbered track or an even-numbered track can be judged by detecting the timing at which the last information pit or position reference pit is generated. This embodiment also will be described below with reference to FIG. 19.

To describe the specific features of the information recording method according to the present invention more clearly, the conventional recording method and the recording method according to the present invention will be compared with reference to FIG. 14. In the optical disk using a conventional sample servo system, as shown in FIG. 14A, the reference clock (channel clock) is generated in synchronism with the clock pit. Then, the period of the reference clock is taken as one unit and a pit having a length corresponding to an integral multiple of the unit is formed. The length of the pit depends on the digital recording information.

Further, although a clock pit is not formed in the compact disc, as shown in FIG. 14B, the period of the reference clock (channel clock) is taken as one unit and a pit having a length corresponding to an integral multiple of the unit is formed.

On the other hand, in the present invention, as shown in FIG. 14C, the reference clock is generated in synchronism with the clock pit in a manner similar to that illustrated in FIG. 14A. However, the basic length of the information pit is selected to correspond to the period of the reference clock (each edge of the information pit in this case is said to be in its respective reference position), and the length of the information pit is changed by shifting the positions of the edges in accordance with the digital recording information. The digital recording information is represented by the shift amount of each edge from its respective reference position. Therefore, the invention provides the information pit with a length that is set to be between once and less than twice the basic length, i.e., the length corresponding to the period of the reference clock, depending on the digital recording information.

As is clear from comparing FIG. 14C with FIGS. 14A and 14B, the invention provides a shorter average pit length, which enables the recording density to be increased.

Moreover, to determine the reference position of the edges more accurately, the position reference pit may be used in addition to the clock pit, if necessary.

In the case of the compact disc, the track pitch is 1.6 $\mu$m, and the linear recording density is 0.6 $\mu$m per bit. On the other hand, in an optical disk according to the present invention, the track pitch could be reduced to 1.2 $\mu$m, and the linear recording density could be selected to be 0.4 $\mu$m per bit. Therefore, a recording density double that of the compact disc can be achieved.

An embodiment of an apparatus according to the invention that can perform the above-mentioned recording and reproducing will be described next. FIG. 15 shows the arrangement of part of the recording apparatus. The data output circuit 51 converts an analog input signal to a digital signal, processes the digital signal in a predetermined fashion, and feeds the processed signal to the error correction (ECC) circuit 52. The error correction circuit 52 effects such processing as adding error correction code, interleaving, or the like to the digital signal. The data length converting circuit 53 converts, for example, the 8-bit words of the digital signal input thereto from the error correction circuit 52 into 3-bit words. The 3-bit words are supplied as the digital recording information to the recording signal generating apparatus shown in FIG. 16.

Figure 16:
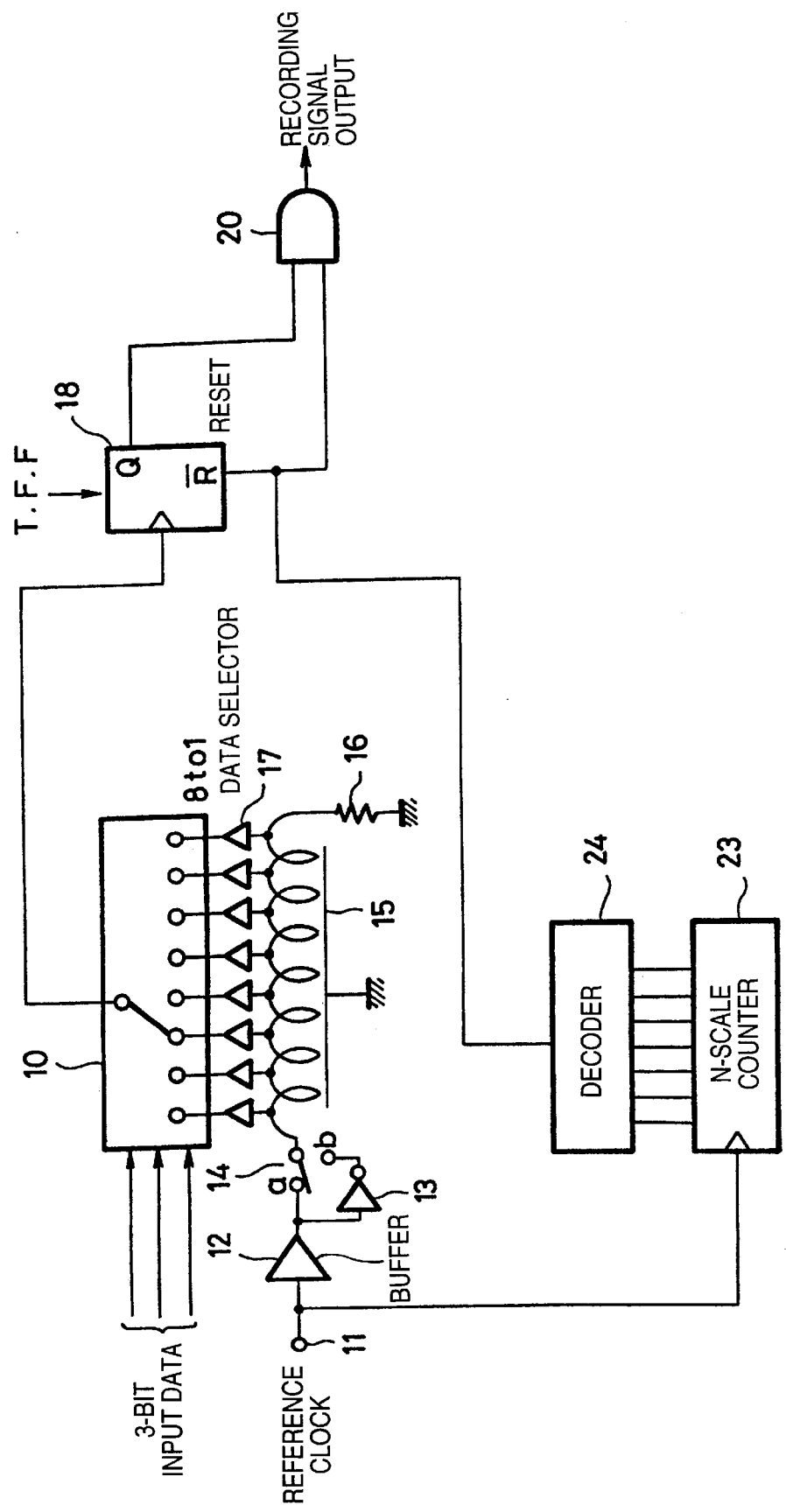
FIG. 16 is a block diagram showing the arrangement of another part of the embodiment of the information recording apparatus according to the present invention.

A reference clock (FIG. 17A) is supplied to the terminal 11 of the recording signal generating apparatus shown in FIG. 16. The reference clock is generated by the phase-lock loop (PLL) circuit 31 shown in FIG. 18, which will be described below, in synchronism with the clock pits reproduced from the optical disk during the recording process. The reference clock is supplied via the buffer 12 and the switch 14 to the delay line 15. The position of the switch 14 is changed to the contact a side when recording on the odd-numbered tracks and to the contact b side when recording on the even-numbered tracks. When the switch is connected to the contact b side, the reference clock inverted by the inverter 13 is input to the delay line 15. The other end of the delay line 15 is grounded via the resistor 16.

The delay line 15 includes 8 output terminals each connected via the buffer 17 to the data selector 10. Consecutive outputs of the delay line 15 have delay times that differ by one unit of delay time. In other words, each output terminal provides the reference clock delayed by a delay time of between one unit of delay time×0 and one unit of delay time×7 times. The unit of delay time is set to a time corresponding to a length of 0.05 $\mu$m on the optical disk. The data selector 10 selects one of the 8 output terminals of the delay line in response to the 3-bit words of the digital recording information it receives from the word length converting circuit 53. For example, the data selector selects the output terminal having a delay time of one unit of delay time×0 (i.e., the data selector outputs the reference clock undelayed) when the recording information value is [0], and selects the output terminal having a delay time of one unit of delay time×5 when the recording information value is [5]. Therefore, the reference clock is delayed by a delay time corresponding to the recording information value. The recording information is delayed in a step-wise fashion in which each step is one unit of delay time. To record the position reference pit, a recording information value of [0] is input to the data selector 10, and the reference clock is output from the data selector 10 undelayed.

A T-type flip-flop 18 is triggered at the front edge of the output from the data selector 10. Each time the flip-flop is triggered, the logic level of its output is inverted. The output of the T-type flip-flop 18 is supplied to one input of the AND gate 20.

The N-scale counter 23 counts the reference clock. The decoder 24 decodes the count value of the counter 23 and generates an output signal with a high logic level during the servo area interval of each sector and a low logic level (see FIG. 17B) during the data interval of each sector. The output signal of the decoder 24 is supplied to the reset terminal of the T-type flip-flop 18 and to the other input of the AND gate 20.

Therefore, during the data interval of each sector, the output signal of the decoder 24 activates the AND gate 20 so that the recording signal (FIG. 17C) output from the T-type flip-flop 18, and whose front and rear edges are delayed in a step-wise fashion by a time corresponding to the 3-bit words received from the word length converter 52, is output through the AND gate 20. The recording signal output from the AND gate 20 is supplied to the recording head (not shown) for the optical disk and is recorded by the recording head on the optical disk. During the servo area interval, the output signal of the decoder 24 deactivates the AND gate 20 to prevent the recording signal from the T-type flip-flop 18 reaching the recording head.

The reproducing apparatus will be described next with reference to FIG. 18. The RF signal reproduced from the optical disk is input to the PLL circuit 31 and the equalizer 34. The PLL circuit 31 extracts the signal component resulting from reproducing the above-mentioned clock pits (FIG. 3A) from the RF signal to generate the reference clock (FIG. 3C), which is then supplied to the sawtooth wave oscillator 33. The sawtooth wave oscillator 33 generates a sawtooth wave signal (FIG. 3D) in synchronism with the reference clock and feeds the sawtooth wave signal to the A/D converters 36 and 37. The reference clock generated by the PLL circuit 31 is also supplied to a timing controller 32. The timing controller 32 supplies a latch pulse at the timing of the front edge of above-mentioned position reference pit (FIG. 3A) to the latch circuit 40 in synchronism with the reference clock and also supplies a latch pulse at the timing of the rear edge of the position reference pit to the latch circuit 42.

The equalizer 34 processes the RF signal to provide the RF signal with a predetermined frequency and phase characteristic. The equalizer feeds the processed RF signal to the binary circuit 35. The binary circuit 35 converts the processed RF signal into a binary signal. The binary signal (FIG. 3B) is supplied to the clock terminal of the A/D converter 36 and the clock terminal of the latch circuit 39. The binary signal is also inverted by the inverter 38 and then supplied to the clock terminal of the A/D converter 37 and to the clock terminal of the latch circuit 41.

The A/D converter 36 samples the level of the sawtooth wave signal (FIG. 3D) at the timing of the front edge of the binary RF signal and converts the sampled level of the sawtooth wave signal to a digital value. Because the level of the sawtooth wave signal is divided into 256 steps as described above, the sampled level is fed to the latch circuits 39 and 40 as an 8-bit word. The latch circuit 39 latches the output of the A/D converter 36 at the timing of the front edge of the binary RF signal from the binary circuit 35. Further, the latch circuit 40 latches the output of the A/D converter 36 at the timing of the front edge of the position reference pit from the timing controller 32.

As described above, the level (the reference position level) [64] of the sawtooth wave at the timing of the front edge of the position reference pit described above with reference to FIG. 5E or the level (the reference position level) [54] of the sawtooth wave at the timing of the front edge of the position reference pit described above with reference to FIG. 5I is latched in the latch circuit 40. Further, the levels (levels indicating displacement relative to the reference position) [82], [76], [70] of the sawtooth wave at the timings of the front edges of the respective information pits described above with reference to FIG. 5E or the levels (levels indicating displacement relative to the reference position) [72], [66], [60] of the sawtooth wave at the timings of the front edges of the respective information pits described with reference to FIG. 5I are sequentially latched in the latch circuit 39. The subtractor 43 subtracts the latched levels from the latch circuit 40 from the latched level of the latch circuit 39. The subtractor 43 subtracts the latched level of the latch circuit 40 from the latched level of the latch circuit 39, and sequentially produces the differences [18], [12], and [6] indicating the displacement relative to the reference position of the front edges of the information pits described above with reference to FIG. 5F, or the corrected differences [18], [12], [6] indicating the displacement relative to the reference position of the front edges of the information pits described above with reference to FIG. 5J.

The 8-bit words representing the level differences are fed from the subtractor 43 to the conversion map circuit 45, where they are converted into the 3-bit words of the digital recording information. The reproduced digital recording information is then fed to the output terminal. If the output of the subtractor 43 is D/A-converted by the D/A converter circuit 47 and the resulting analog signal is then monitored, then the characteristic shown in FIG. 7 (or FIG. 6) can be monitored as described above.

The A/D converter 37 samples the level of the sawtooth wave signal at the timing of the rear edge of the binary RF signal, and converts the sampled level of the sawtooth wave signal to a digital value. The sampled level is fed to the latch circuits 41 and 42 as an 8-bit word. The latch circuit 41 latches the level from of the A/D converter 37 at the timing of the rear edge of the binary RF signal. Further, the latch circuit 42 latches the level from the A/D converter 37 at the timing of the rear edge of the position reference pit output from the timing controller 32.

As described above, the level (reference position level) [64] of the sawtooth wave signal at the timing of the rear edge of the position reference pit described above with reference to FIG. 5E or the levels (reference position level) [74] of the sawtooth wave signal at the timing of the rear edge of the position reference pit described above with reference to FIG. 5I is latched in the latch circuit 42. Further, the levels (levels indicating displacement relative to the reference position) [64], [94], [64] of the sawtooth wave signal at the timing of the rear edges of the information pits described in FIG. 5E or level (levels indicating displacement relative to the reference position) [74], [104], [74] of the sawtooth wave signal at the timing of the rear edges of the information pits described in FIG. 5I are latched in the latch circuit 41. The subtractor 44 sequentially subtracts the latched levels from the latch circuit 42 from the latched levels from the latch circuit 41, and sequentially produces the differences [0], [30], and [0] indicating the displacement relative to the reference position of the rear edges of the information pits described above with reference to FIG. 5F, or produces the corrected differences indicating the displacement relative to the reference position of the rear edges of the information pits described above with reference to FIG. 5J.

The 8-bit words representing the level differences are fed from the subtractor 44 to the conversion map circuit 46, where they are converted into the 3-bit words of the digital recording information. The reproduced digital recording information is then fed to the output terminal.

While the above description describes two A/D converters being used, the present invention is not limited to this configuration. Only one A/D converter may be used if a switch is used to switch the signal from the binary circuit 35 or the inverter 38 to the clock terminal of the A/D converter. Further, a sample and hold circuit may be used instead of the A/D converter. Furthermore, the displacement of the edge can be detected by generating a count clock having a frequency sufficiently higher than the reference clock and a predetermined period synchronized with the reference clock The count clock is counted by a counter, and the counter is latched at the timing of the front edge or the rear edge of the binary RF signal.

While the level of the sawtooth wave signal at the timing of the position reference pit of every sector is described above as being exclusively latched by the latch circuits 40 and 42, and then being used for correction, the present invention is not limited to this. A variation is possible in which an average of the levels of the sawtooth wave at the timings of the position reference pits of plural sectors is obtained and the average level used for correction. If this is done, reliability can be increased.

Figure 19:
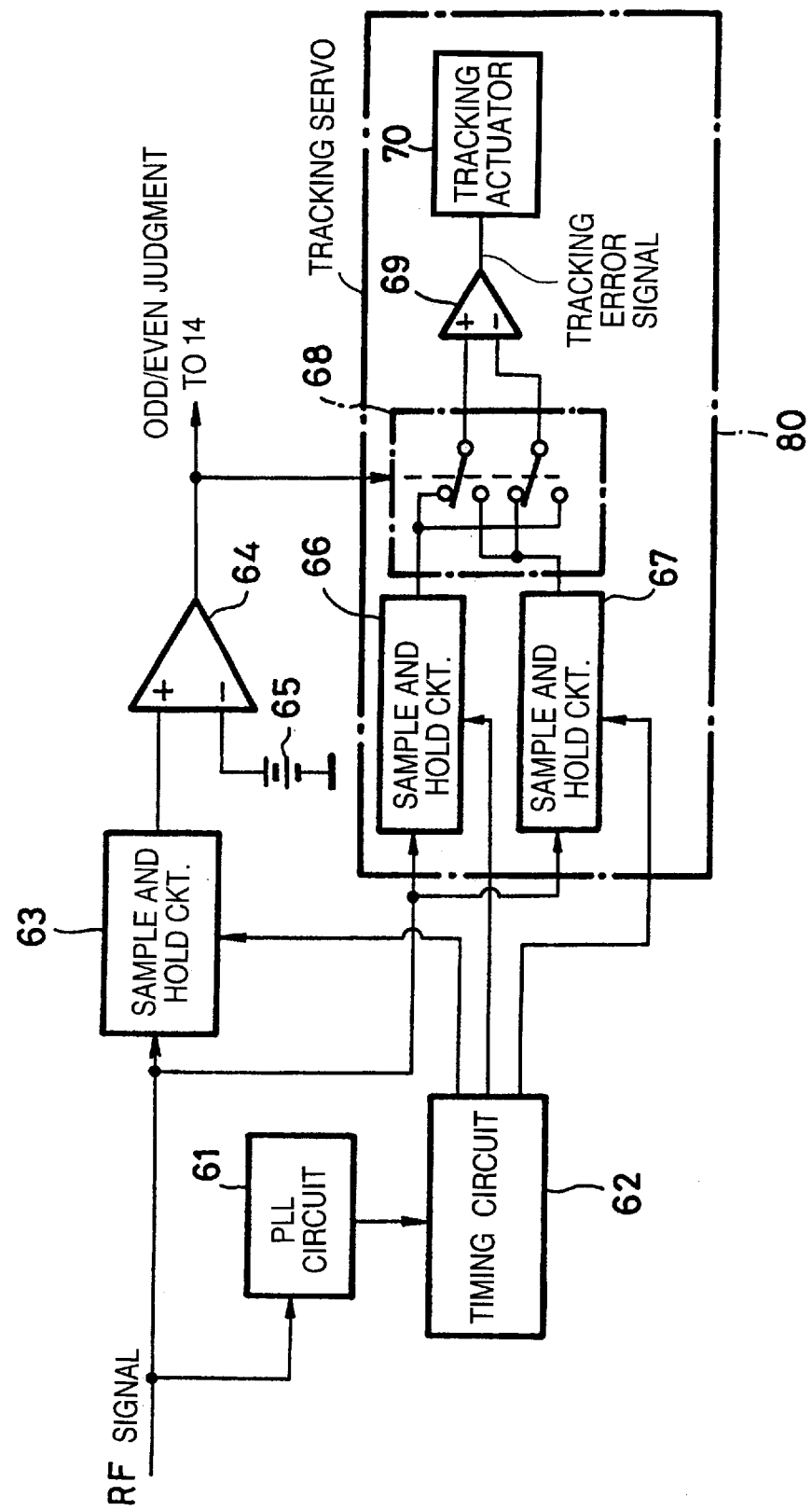
FIG. 19 is a block diagram showing the arrangement of an embodiment of the tracking servo in an information recording and reproducing apparatus according to the present invention.

FIG. 19 shows a circuit arrangement for judging the odd-numbered track and the even-numbered track when the optical disk has the format in which a wobble pit is common between adjacent tracks, and the phases of the position reference pit and the information pit are shifted by 90 degrees between adjacent tracks. The circuit also switches the polarity of the tracking servo in response to the judgment result. In this embodiment, the RF signal reproduced from the optical disk is supplied to the PLL circuit 61 and the sample and hold circuit 63. The PLL circuit 61 generates the reference clock from the component of the RF signal resulting from reproducing the clock pits and feeds the reference clock to the timing circuit 62. The timing circuit 62 generates three timing signals synchronized with the reference clock supplied by the PLL circuit 62, and supplies the timing signals to the sample and hold circuits 63, 66 and 67.

As earlier noted with reference to FIG. 13, if the phase of the pits is shifted by 90 degrees between adjacent tracks, then the timing of the last information pit (or the position reference pit) relative to the reference clock is different between the odd-numbered tracks and the even-numbered tracks. The timing circuit 62 feeds a sampling pulse to the sample and hold circuit 63 at the timing of the last information pit in the even-numbered track and the timing at which there is no last information pit in the odd-numbered track (see FIG. 13). Since the information pit exists at this timing in the even-numbered track, the level of the RF signal at the timing of the sampling pulse is small. On the other hand, since no information pit exists in the odd-numbered track, the level of the RF signal at this timing is larger than that reproduced from the even-numbered track. Accordingly, the level of the RF signal at the timing of the sampling pulse is sampled and held in the sample and hold circuit 63.

The comparator 64 compares the held value from the sample and hold circuit 63 with the reference voltage output from the reference voltage generating circuit 65. This reference voltage is set to an intermediate value between the held value generated by the sample and hold circuit 63 in response to the odd-numbered track and the held value generated in response to the even-numbered track. Therefore, in the case of the odd-numbered track, the output of the comparator 64 goes to a high level, while in the case of the even-numbered track, the output goes to a low level. The output of the comparator 64 is used to change the state of the switch 14 shown in FIG. 16, and is also used to change state of the switch 68 in the tracking servo circuit 80.

The timing circuit 62 supplies the sampling pulse to the sample and hold circuit 66 at the timing of one of the wobble pits shown in FIG. 13, and supplies the sampling pulse to the sample and hold circuit 67 at the timing of the other of the wobble pits. Accordingly, the sample and hold circuits 66 and 67 sample and hold the levels of the RF signal at the timings of the two wobble pits. The differential amplifier 69 subtracts the output of the sample and hold circuit 67 from the output of the sample and hold circuit 66 to generate a tracking error signal. The tracking error signal is supplied to the tracking actuator 70, which effects tracking control in response to the tracking error signal. The input terminals of the differential amplifier 69 to which the outputs of the sample and hold circuits 66 and 70 are supplied are switched over by the switch 68 in response to the output of the comparator 64, which indicates whether the track is an odd-numbered track or an even-numbered track. Therefore, the tracking servo can operate correctly even when one wobble pit is used commonly by adjacent tracks.

In this first embodiment of the information signal recording apparatus according to the invention, since the edge position of the information pit is shifted in a step-wise fashion relative to the reference position in response to the digital recording information to represent the digital recording information, the digital recording information can be recorded at a higher density.

In this first embodiment of the information recording medium according to the invention, since the information pits are formed such that the position of the edges of each information pit are changed in a step-wise fashion in response to the recording information, it is possible for the recording medium to have a higher recording density.

In the first embodiment the information recording medium according to the invention, since the phase of the information pits is shifted by 90 degrees between adjacent tracks, it is possible for the information recording medium to have a narrow track pitch with less crosstalk.

In the first embodiment of the information reproducing apparatus according to the invention, since the displacement of the edges of the information pits relative to the reference position is detected, digital recording information that was recorded with a high density can be reproduced accurately.

In the first embodiment information of the recording apparatus according to the invention, since a position reference pit indicating the reference positions of the edges of the information pits is recorded, the velocity of the information recording medium can easily be controlled during recording.

In the first embodiment of the information recording medium according to the invention, since a position reference pit indicating the reference positions of the edges of the information pits is formed with a predetermined ratio to the information pits, the influence of jitter upon reproduction can be reduced and an information recording medium is provided from which the digital recording information can be read out accurately.

In the first embodiment of the information reproducing apparatus according to the invention, since the detected position of the edge of the information pit is corrected according to the detected position of the edge of the reference pit, the influence of jitter can be reduced, which makes it possible to read out the digital recording information accurately.

In the first embodiment of the information recording medium according to the invention, since the wobble pits for tracking are arranged to be used commonly by adjacent tracks, the track pitch can be made narrower.

In the first embodiment of the information recording and reproducing apparatus according to the invention, the track pitch can be made narrow and more information can be recorded because the polarity of the tracking performed using the wobble pits is switched between the odd-numbered track and the even-numbered track, and the phase of the information pits is shifted by 90 degrees, so that the information recording apparatus according to the invention can perform accurate tracking even when the track pitch is narrow.

Figure 20:
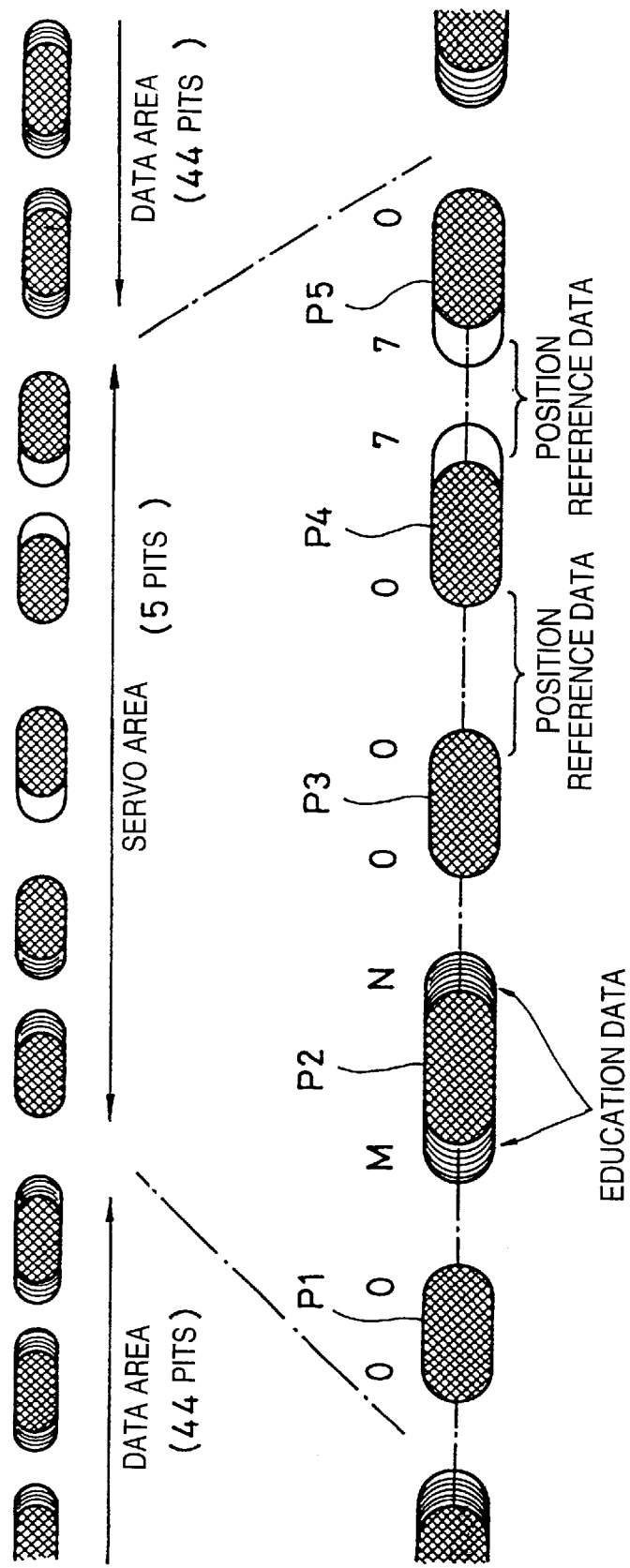
FIG. 20 shows the track format of the information recording medium according to the present invention.

FIG. 20 shows the basic format of an optical disk as an example of an information recording medium according to a second embodiment of the present invention. In this embodiment, a servo area is provided periodically in each track and a data area is formed between each servo area and the next. In the example shown, the servo area has 5 pits and the data area has 44 pits. Of the 5 pits in the servo area, two pits P1 and P2 are designated as education pits and the remaining 3 pits are designated as reference pits. The front edge of the education pit P2 is set to one position M of any of the 8 shift positions 0 to 7. The rear edge is set to one position N of any of the 8 shift positions 0 to 7.

Figure 21:
FIG. 21 shows an example of the arrangement of the reference pits, the education pits, and the information pits in an alternative embodiment of the information recording medium of the present invention.

As shown in FIG. 21, the front edge of each information pit is shifted in a stepwise fashion to any one of the 8 shift positions 0 to 7 in response to the digital recording information $a_n$. Similarly, the position of the rear edge of the information pit is shifted in a stepwise fashion to any one of the 8 shift positions of 0 to 7 in response to the digital recording information $b_n$. The pitch of the shift positions is Δ. As a result, the pit has the shortest length Lp when both of the digital recording information $a_n$ and $b_n$ cause the respective edge to be formed at the shift position 0.

The positions M and N of the edges of the education pit P2 are set to different combinations in successive servo areas. More specifically, M and N are set to, for example, (0, 0) in the first servo area and set to (0, 1) in the next servo area. Similarly, they will be set to (0, 2), (0, 3), . . . (7, 6), (7, 7) in the following servo areas. That is, in 64 (=8×8) successive servo areas, all combinations of the possible positions of the front and rear edges of the education pit P2 are recorded.

In this embodiment, the education pit P1 serves as a buffer pit. Theoretically, the education data can be recorded using the positions of the front and rear edges of the pit P1, instead of the pit P2. However, the pit adjacent the front edge of the pit P1 is a information pit in the data area, so if this is done, then the actual position of the front edge of the pit P1 will change in response to the data recorded in the information pit. As a result, the degree with which the information pit interferes with the positions of the edges of the education pit P1, particularly with the position of the edge adjacent the information pit, changes depending upon the value of the digital recording information. This makes it difficult to form the education data as a constant pattern, as will be described later on. Therefore, it is preferable to record the education data on the front and rear edges of the education pit P2 as in this embodiment. With this arrangement, the edges of the reference pit P3 adjoining the rear edge of the education pit P2 and of the education pit P1 adjoining the front edge of the education pit P2 are formed at a constant (0, 0) position so that, when the education data represented by the positions of the front and rear edges of the education pit P2 is read out, the intersymbol interference to which the education data is subject is constant, and hence a constant readout pattern can be obtained.

The positions of the edges of the reference pits P3 to P5 are used to obtain data represented by the reference positions of (0, 0) and (7, 7). Theoretically, these reference position data can be represented by the positions of the front and rear edges of, for example, the pit P5. If this is done, however, for reasons similar to those described above with reference to the education pit, the degree of interference from the adjacent information pit changes depending on the digital recording information. Therefore, it is preferable that the reference position data be not formed on the rear edge of the reference pit P5, as shown in the FIG. 20.

Figure 22:
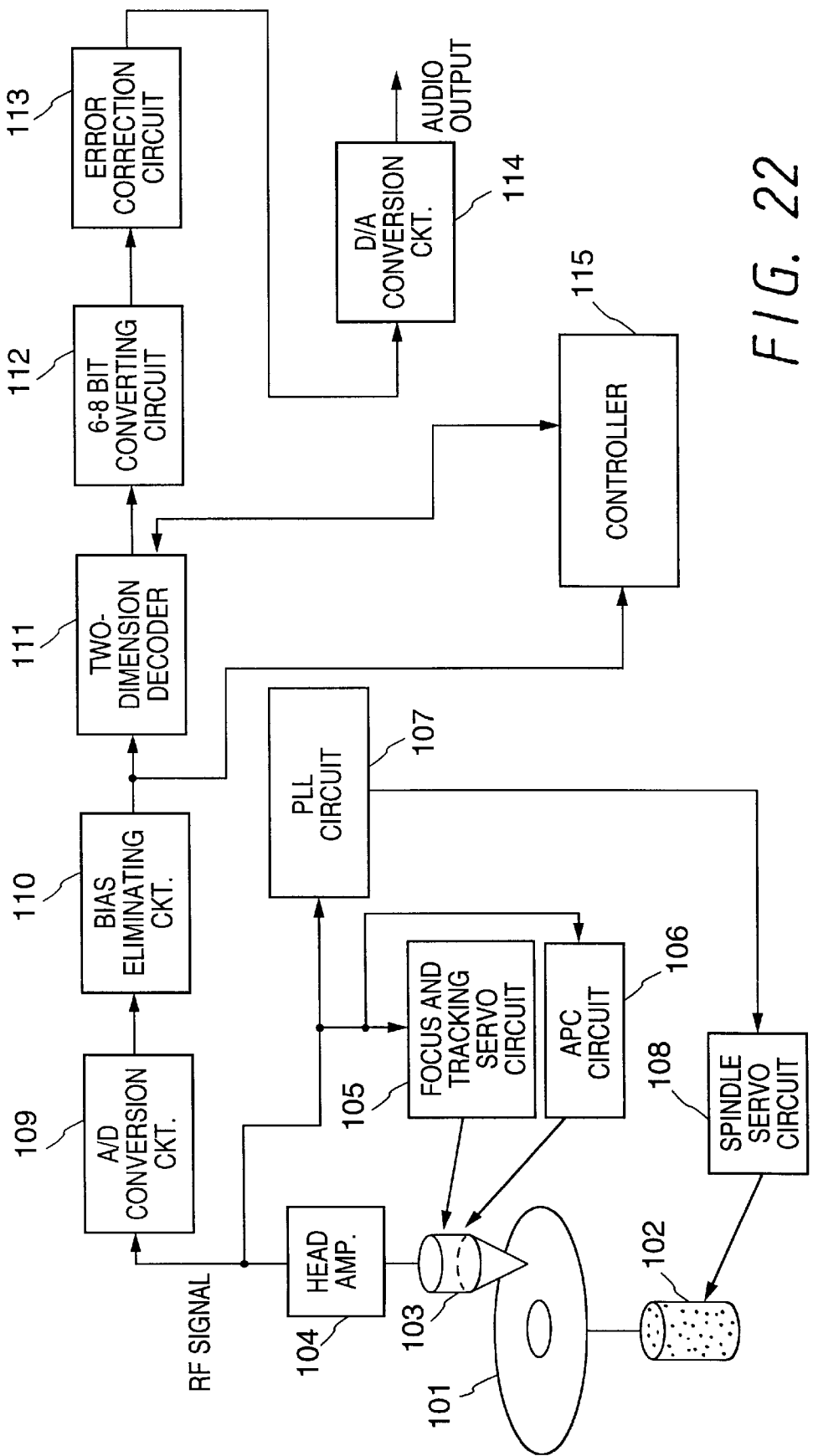
FIG. 22 is a block diagram showing the arrangement of an alternative embodiment of an optical disk reproducing apparatus incorporating an alternative embodiment of the information reproducing apparatus according to the present invention.

FIG. 22 is a block diagram showing the arrangement of an embodiment of an optical disk reproducing apparatus as an example of the information reproducing apparatus according to the second embodiment of the invention. The optical disk 101 is rotated by the spindle motor 102. Digital recording information is recorded on the optical disk 101 in accordance with the principles shown in FIGS. 20 and 21. In other words, the digital recording information is recorded by shifting the position of the front edge, or the rear edge, or both the front and rear edges of the information pit in a step-wise fashion relative to a predetermined reference position. The servo areas, including the education pits P1 and P2 and the reference pits P3 to P5, are formed periodically in the optical disk 101. The information pits are formed in the data areas between the servo areas.

The pickup 103 illuminates the optical disk 101 with laser light to reproduce the digital recording information recorded on the optical disk 101 by generating an RF signal in response to the light reflected from the disk. The RF signal from the pickup 103 is amplified by the head amplifier 104 and the amplified signal is supplied to the focus and tracking servo circuit 105, the automatic power control (APC) circuit 106, and the phase-lock loop (PLL) circuit 107. The focus and tracking servo circuit 105 generates a focus error signal and a tracking error signal in response to the amplified RF signal and executes focusing control and tracking control in response to these error signals. The APC circuit 106 effects servo control to make the intensity of the laser light illuminating the optical disk 101 constant. Further, the PLL circuit 107 extracts from the amplified RF signal the clock component resulting from reproducing the clock pits and feeds the clock component to the spindle servo circuit 108. The spindle servo circuit 108 controls the spindle motor 102 in synchronism with the clock component to rotate the optical disk 101 at either a constant angular velocity or a constant linear velocity.

The amplified RF signal from the head amplifier 104 is fed to the A/D converter circuit 109, where it is converted to digital data representing the level of the RF signal. The digitally-represented levels are passed from the A/D converter to the bias eliminating circuit 110, which eliminates the bias component from the levels. The resulting level differences representing the shift of the positions of the edges relative to the reference positions are then supplied to the two-dimensional decoder 111 and the controller (CPU) 115. The two-dimensional decoder 111 decodes the level differences received from the bias eliminating circuit 110 and supplies the resulting 6-bit words of the reproduced digital recording information to the 6–8 bit converting circuit 112. The 6–8 bit converting circuit 112 converts the 6-bit words of the reproduced digital recording information received from the two-dimensional decoder into 8-bit words and supplies the 8-bit words to the error correction circuit 113. The error correction circuit 113 corrects errors in the 8-bit words received from the 6–8 bit converting circuit 112 and supplies error-corrected words to the D/A converting circuit 114. The D/A converting circuit 114 converts the error-corrected words into an analog signal, which it supplies to an output terminal.

Figure 23:
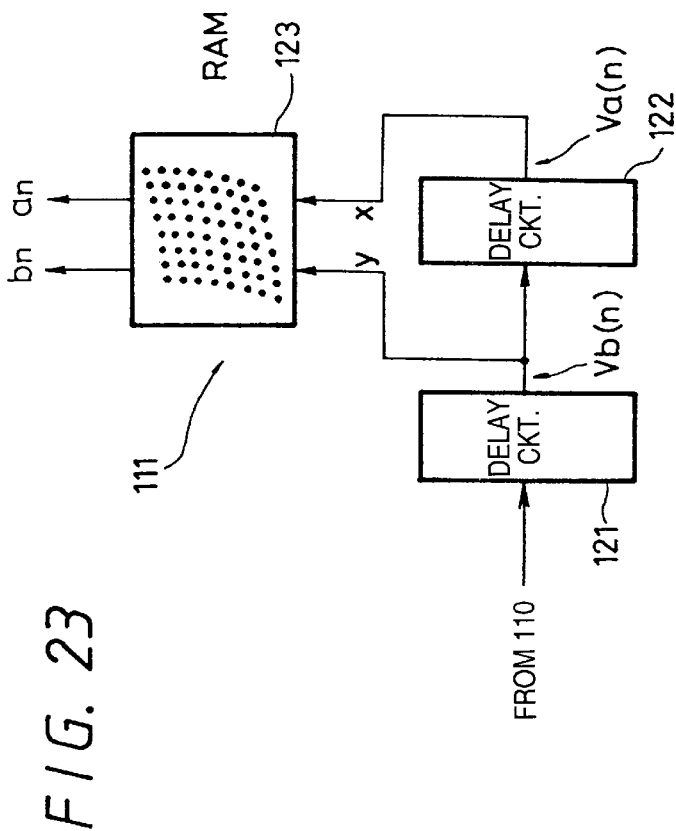
FIG. 23 is a block diagram showing an example of the arrangement of the two-dimension decoder in the embodiment shown in FIG. 22.

The two-dimensional decoder 111 is constructed as shown, for example, in FIG. 23. The digital data supplied by the bias eliminating circuit 110 are sequentially delayed by the delay circuits 121 and 122. The data delayed by the first delay circuit 121 and the data delayed by the second delay circuit 122 are fed to the RAM 123 as address data. The RAM 123 reads out data stored at the address therein corresponding to the address data supplied from the delay circuits 121 and 122 and feeds the read out data to the 6–8 converting circuit 112.

Figure 24:
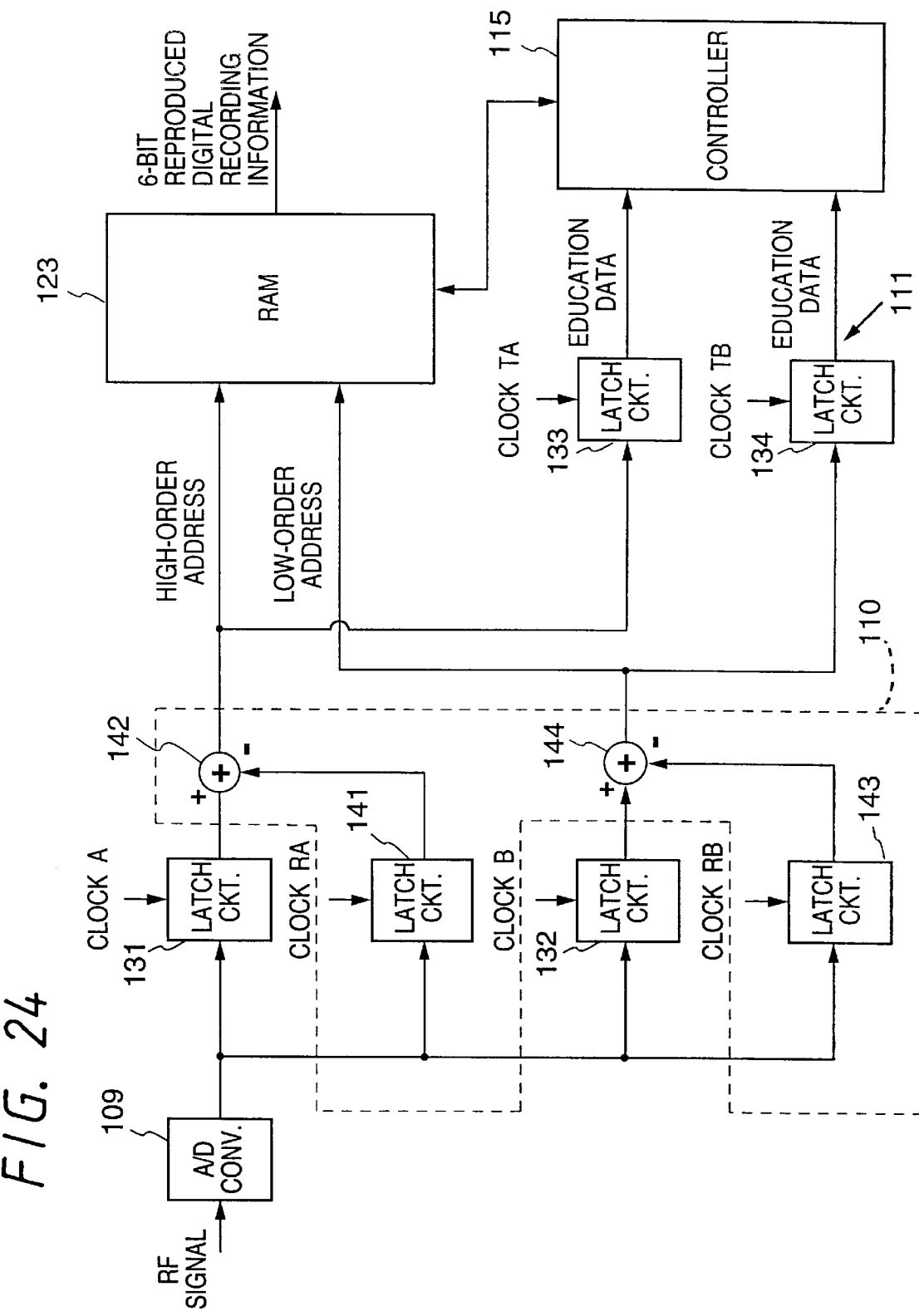
FIG. 24 is a block diagram showing an example of the arrangement of the bias eliminating circuit and the two-dimension decoder in the embodiment shown in FIG. 22.
Figure 25:
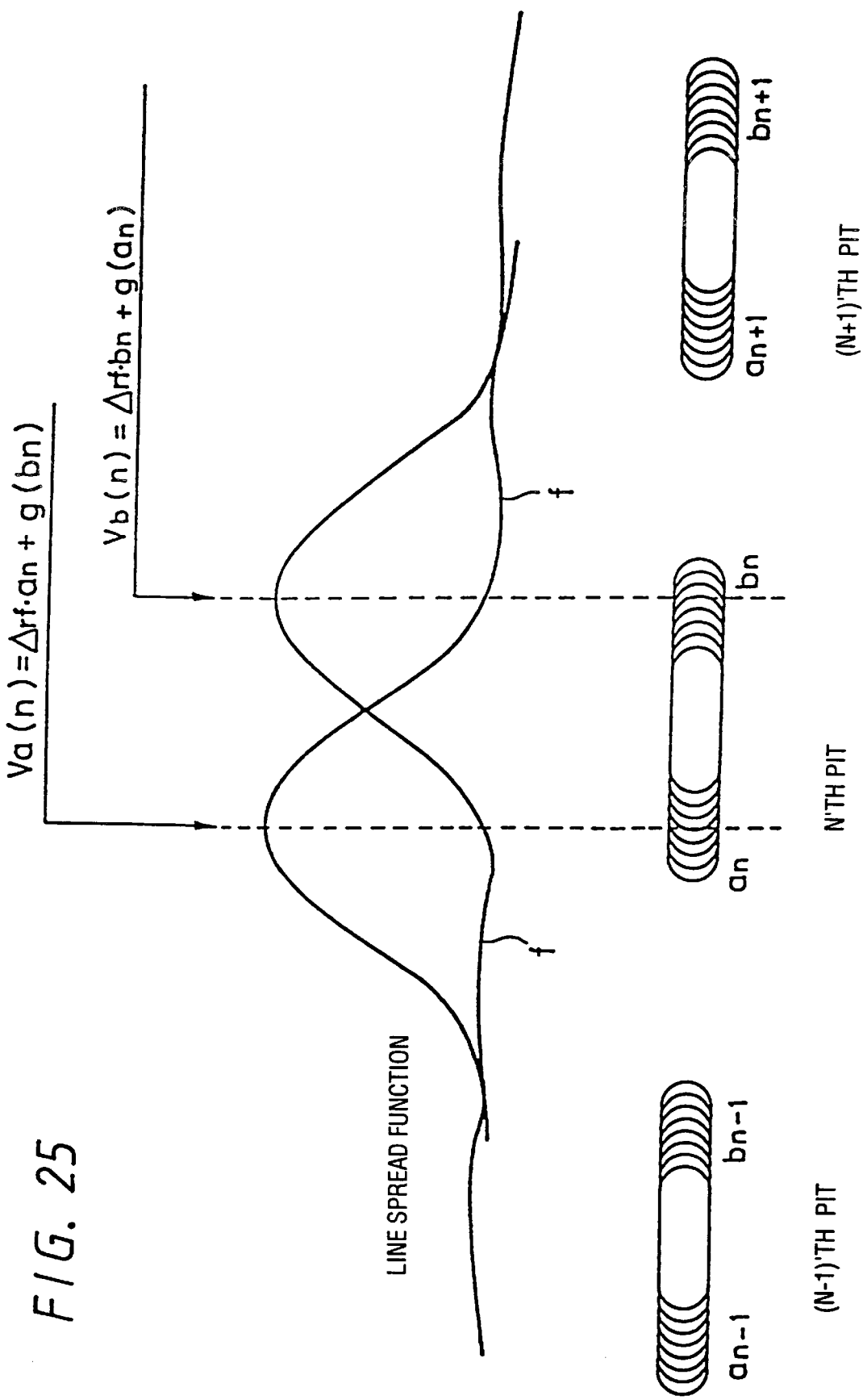
FIG. 25 shows intersymbol interference between adjacent edges of the information pit.

FIG. 24 shows in more detail an example of the circuit arrangement of the bias eliminating circuit 110 and the two-dimensional decoder 111. Data from the A/D converter circuit 109 are supplied to the latch circuits 131 and 132, and are also supplied to the latch circuits 141 and 143 that, together with the subtractors 142 and 144, constitute the bias eliminating circuit 110. The subtractor 142 subtracts the data latched in the latch circuit 141 from the data latched in the latch circuit 131 to generate a first difference, and the subtractor 144 subtracts the data latched in the latch circuit 143 from the data latched in the latch circuit 132 to generate a second difference.

The differences from the subtractors 142 and 144 are respectively supplied to the RAM 123 as a high-order address and a low-order address. The latch circuits 133 and 134 latch at predetermined timings the education data supplied thereto from the subtracting circuits 142 and 144, and supply the latched education data to the CPU 115. The CPU 115 forms the education data into a pattern, which it maps into the RAM 123.

The principle of how the shift position of the information pit is read according to this embodiment will first be described, after which, the operation of the above-mentioned embodiment will be described.

Assuming for now that the pits are sufficiently distant from one another that intersymbol interference from the adjacent pit can be ignored, then the output data of the A/D converter circuit 109 at the timings of the non-shifted front and rear edges of n-th pit are Va(n) and Vb(n). Va(n) and Vb(n) indicate the levels of the RF signal and can be expressed by the following equations:

$$Va(n) = A \times a_n + g(b_n)$$

$$Vb(n) = A \times b_n + g(a_n)$$

where $a_n$ and $b_n$ are the digital recording information respectively represented by the positions of the front edge and the rear edge of the pit, and g( ) is a nonlinear function that expresses the intersymbol interference between the two edges of the pit. The value of this function increases as the recording density increases (i.e., as the two edges of the pit come closer). The digital recording information represented by the edges of the pit is decoded by solving the above simultaneous equations to obtain the digital recording information $a_n$ and $b_n$ from the reproduced signals.

Decoding the reproduced signals Va(n) and Vb(n) to obtain the digital recording information $a_n$ and $b_n$ represented by the pit can be regarded as a pattern recognition problem in two-dimensional space. If the above equations are calculated for all combinations of ($a_n$, $b_n$) and resulting values of Va(n) and Vb(n) are respectively plotted in two-dimensional space as a value on the X axis and a value on the Y axis, then values that Va(n) and Vb(n) can take can be expressed as the information points shown in FIG. 26. In this two-dimensional plane, the function g( ) that expresses the influence of the intersymbol interference results in a positional distortion of the information point. More specifically, if the function g( ) is 0 (as when intersymbol interference does not occur), the information points are located at the reference points represented by the intersections of the broken lines shown in FIG. 26. However, in actual practice, the intersymbol interference functions $g(a_n)$, $g(b_n)$ increase monotonically as shown, for example, in FIG. 27. Consequently, as shown in FIG. 26, the information points represented by solid circles in the figure are displaced from the reference points.

Figure 28A:
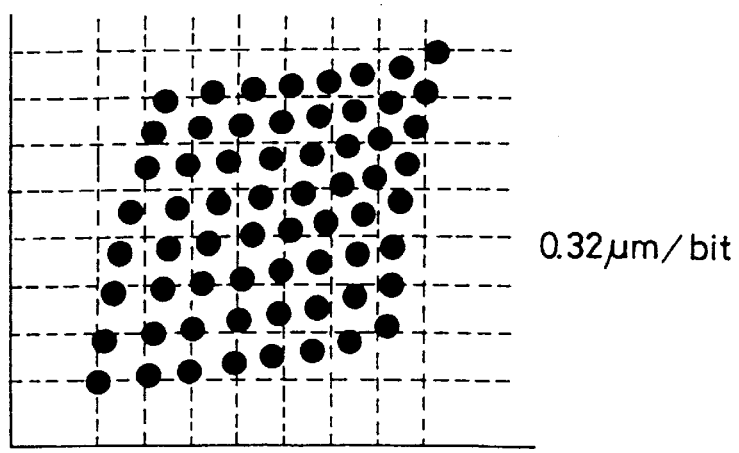
FIGS. 28A–28C show the relationship between the interference between adjacent edges and linear recording density.
Figure 28B:
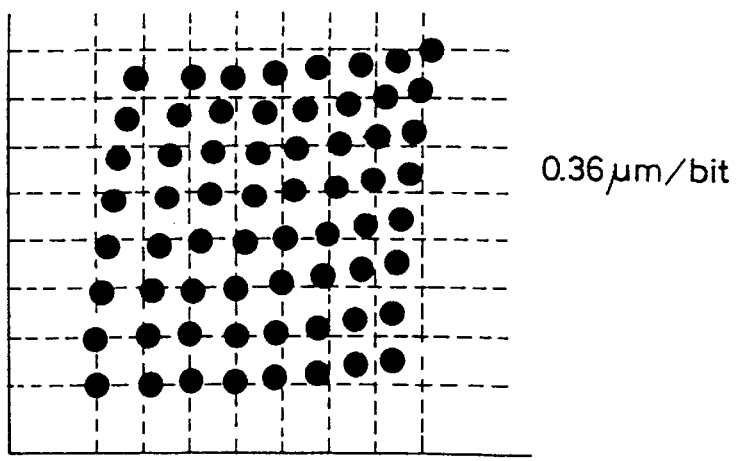
Figure 28C:
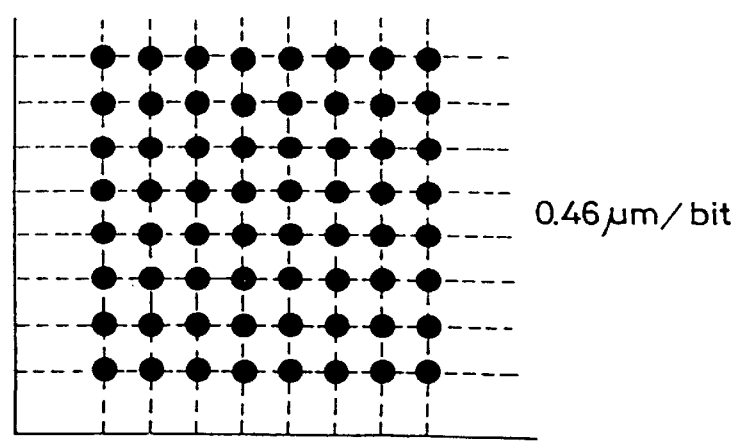

The above-mentioned displacement due to intersymbol interference increases as the intersymbol interference increases, as shown in FIG. 28. FIG. 28A shows the displacement resulting when the linear recording density is set to 0.32 μm/bit and FIGS. 28B and 28C show the displacements resulting when the linear recording density is reduced to 0.36 μm/bit and 0.46 μm/bit, respectively. It can be seen that the displacement increases as the recording density increases.

Figure 26:
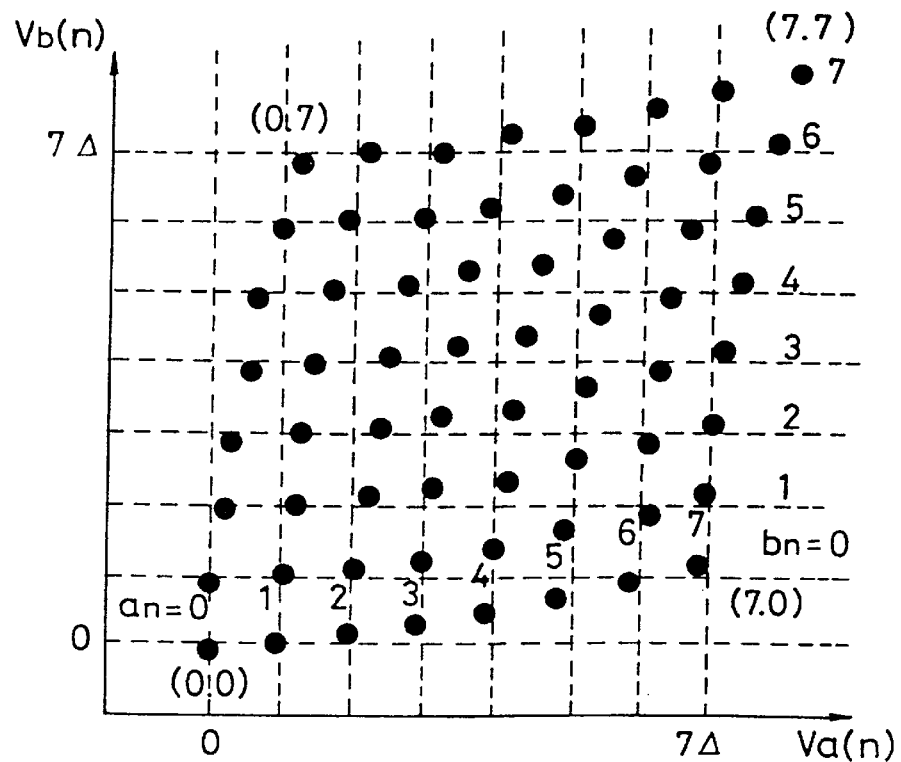
FIG. 26 shows the principle of mapping reference points in a RAM.
Figure 27A:
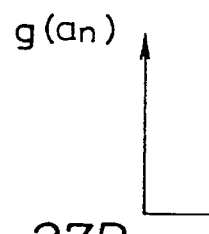
FIGS. 27A–27B illustrates a function characterizing the interference between adjacent edges.
Figure 27B:
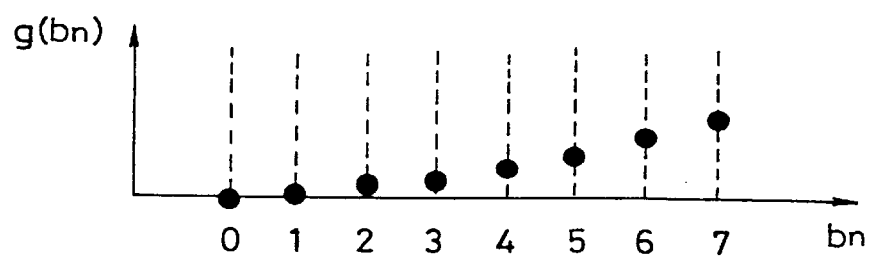

The education data recorded in the above-described education pit P2 is reproduced and the information point defined by that reproducing level is mapped in the RAM 123 as the respective one of the reference points represented by the solid circles in FIG. 26. Then, the information point that results from reproducing the information pit is plotted in the RAM 123 and it is judged that the closest reference point is the reference point corresponding to the information point. Then, the edge positions ($a_n$, $b_n$) represented by this reference point are output from the RAM as the edge positions of the read out information point.

The mapping operation of the reference points in the RAM 123 will be described with reference to the timing chart shown in FIG. 29.

The optical pickup 109 reproduces the signal recorded on the optical disk 101. The reproduced RF signal is supplied via the head amplifier 140 to the A/D converter circuit 109, where it is converted into digital data representing the level of the RF signal. The digitally-represented levels from the A/D converter circuit 109 are latched in the latch circuits 131, 132, 141 and 143, at timings determined by the clock signals A (FIG. 29C), B (FIG. 29D), RA (FIG. 29E), and RB (FIG. 29F), respectively.

The clock signals A, B, RA, RB, TA (FIG. 29C) and TB (FIG. 29H) shown in FIG. 29 are clock signals that are generated to have predetermined phase relationships to the positional reference pits, the information pits, and the education pits on the basis of the clock pits recorded on the optical disk 101. As will be clear from FIG. 29, the clock A and the clock B are respectively generated at the timings at which the level generated in response to the front edge and the rear edge of each pit are latched. Further, the clock signals RA and RB are generated at the timings at which the reference position levels (0, 0) generated in response to the front and rear edge, respectively, of the reference pit P3 of respective servo area are latched.

The latch circuits 141 and 143 latch the reference position levels (0, 0) generated in response to the front edge and the rear edge of the reference pit P3 in the preceding servo area. When the latch circuits 131 and 132 respectively latch the education levels generated in response to the front edge and the rear edge of the education pit P2, the subtractor 142 subtracts the latched reference level from the latch circuit 141 from the latched education level from the latch circuit 131. Similarly, the subtractor 144 subtracts the reference level latched in the latch circuit 143 from the education level latched in the latch circuit 132.

The subtractor 142 generates the level difference corresponding to the displacement between the position 0 and the position M (M is any value of 0 to 7) of the education pit P2. Also, the subtractor circuit 144 generates the level difference corresponding to the displacement between the position 0 and the position N (N is any value of 0 to 7). When the level resulting from reproducing the position 0 is subtracted from the level resulting from reproducing the position M or N, as described above, the DC component (bias component) of the reproduced level is eliminated. Levels whose DC component is eliminated are supplied to the latch circuits 133 and 134, respectively. The timings of the clock signals TA and TB indicate when the level difference is the result of reproducing the education pit. The clock signals TA and TB cause the latch circuits 133 and 134 to latch these level differences, and feed the latched level differences to the CPU 115. In other words, the latch circuits 133 and 134 latch the education data, which are the education levels whose DC component is eliminated, and feed each of the education data to the CPU 115 where it serves to define the address of a storage point. The digital recording information represented by the shift position from which the education data was generated is stored at this storage point as a reference point.

Of course, the absolute levels resulting from reproducing each shift position could be latched as the education data without subtracting the level resulting from reproducing the reference position pit. However, if this is done, any change in these absolute levels due to a variation in the disk or the optical system will make it impossible to judge each shift amount. Therefore, it is preferable to reduce the influence of variations in the disk and the optical system by subtracting the levels resulting from reproducing the reference position pit (0, 0) from the levels resulting from reproducing the education pits.

The CPU 115 maps the information points as reference points to an address in the RAM 123 defined by two coordinates. The CPU 115 uses the education data from the latch circuit 133 as the value of the abscissa of FIG. 26 and the education data from the latch circuit 134 as the value of the ordinate in FIG. 26.

Figure 30:
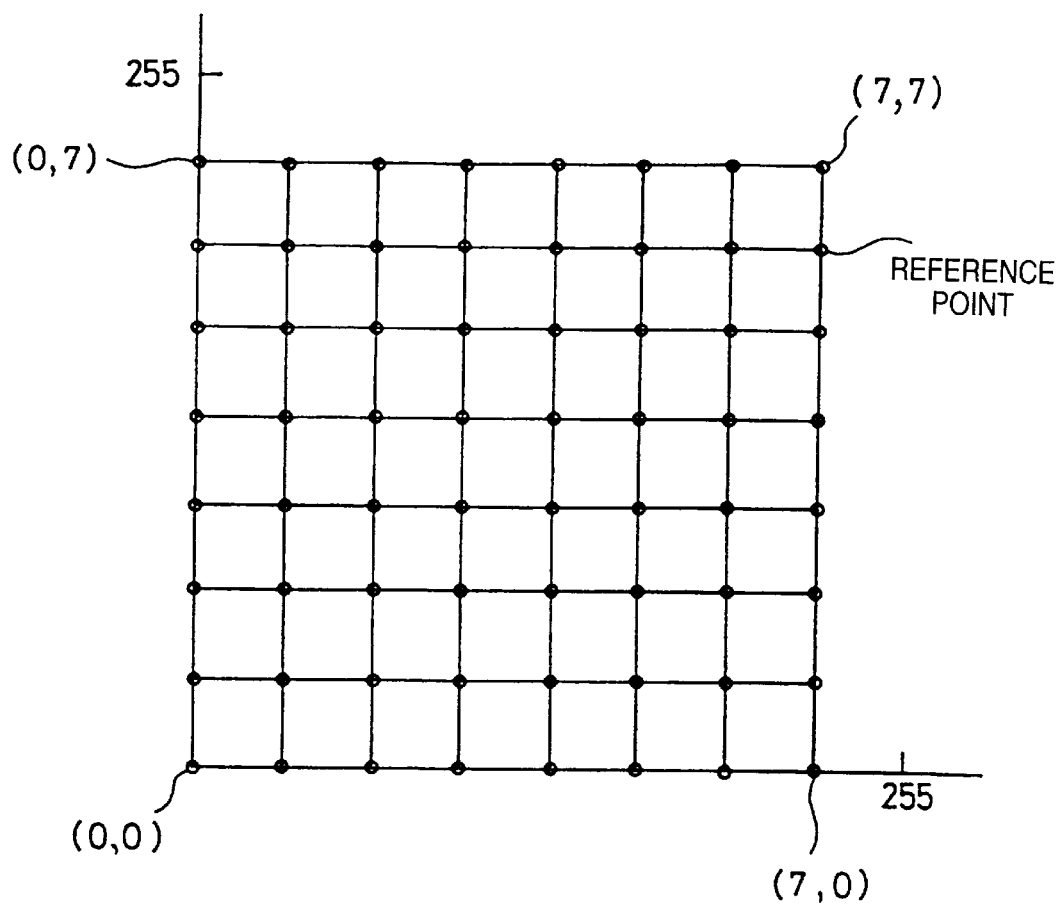
FIG. 30 shows the mapping of reference points in the RAM shown in FIG. 24.

The above-mentioned mapping operation is carried out using the education data reproduced from the 64 servo areas and results in the 64 reference points corresponding to the 64 possible values of the digital recording information being mapped to predetermined storage points in the RAM 123, as shown in FIG. 30.

Figure 31:
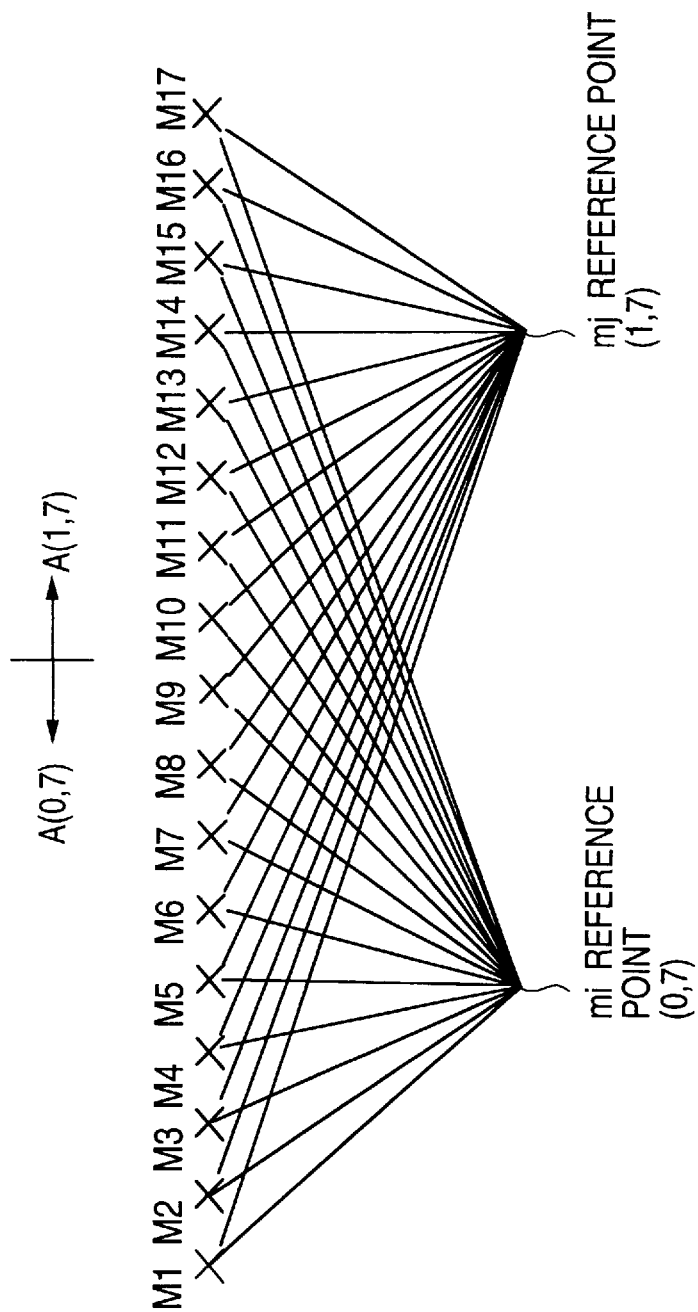
FIG. 31 shows the mapping of reference points corresponding to other storage points in the RAM shown in FIG. 24.

Then, the CPU 115 calculates the distances of the remaining storage points in the RAM 123 relative to the storage points at which the 64 reference points are stored. More specifically, as shown in FIG. 31, for example, the distances of the storage points $m_1$ to $m_{17}$ relative to the storage point $m_i$ at which the reference point (0, 7) is stored are calculated. Similarly, the distances of the storage points $m_1$ to $m_{17}$ relative to the storage point $m_j$ at which the reference point (1, 7) is stored are also calculated. Then, each reference point is copied into those of the storage points that are closest to the storage point at which the reference point was originally stored.

When the A/D converter circuit 109 generates eight-bit words, for example, then the output of the A/D converter can represent 256 possible levels. Accordingly, the RAM 123 can have 256 abscissa addresses and 256 ordinate addresses. In other words, the RAM 123 can include 256×256 storage points. Of these storage points, the reference points are stored at the predetermined storage points shown in FIG. 30.

Then, distances between the storage points at which the reference points are stored and the other storage points at which the reference points are not yet stored are calculated, and each reference point is then copied into those of the storage points that are closest to the storage point at which the reference point was originally stored. In the example shown in FIG. 31, of the storage points $m_1$ to $m_{17}$, the storage points $m_1$ to $m_9$ are closest to the storage point $m_i$ (where the reference point (0, 7) is stored) and the storage points $m_{10}$ to $m_{17}$ are closest to the storage point $m_j$ (where the reference point (1, 7) is stored). Therefore, the reference point (0, 7) is copied into the storage points $m_1$ to $m_9$. In other words, the storage points $m_1$ to $m_9$ define the area A (0, 7) corresponding to the reference point (0, 7). On the other hand, the reference point (1, 7) is copied into the storage points $m_{10}$ to $m_{17}$. That is, the storage points $m_{10}$ to $m_{17}$ define the area A (1, 7) corresponding to the reference point (1, 7).

Figure 32:
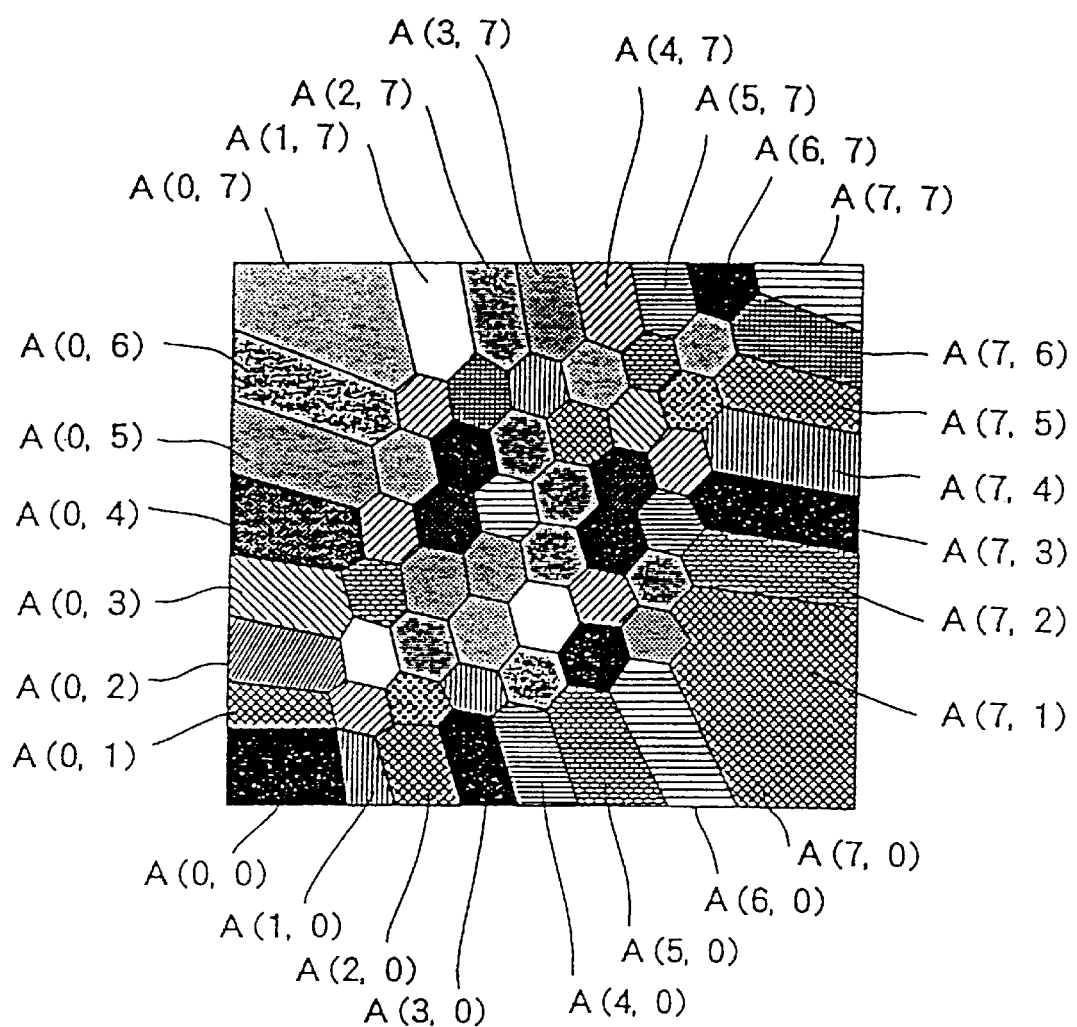
FIG. 32 shows the mapping of the reference points in all the storage points in the RAM shown in FIG. 24.

The reference points are copied in the manner described above into all of the 256×256 storage points in the RAM 123 so that areas in the RAM corresponding to the respective reference points are defined as shown in FIG. 32. The reference point (i, j) is copied into all the storage points included in the respective area A (i, j).

Figure 33:
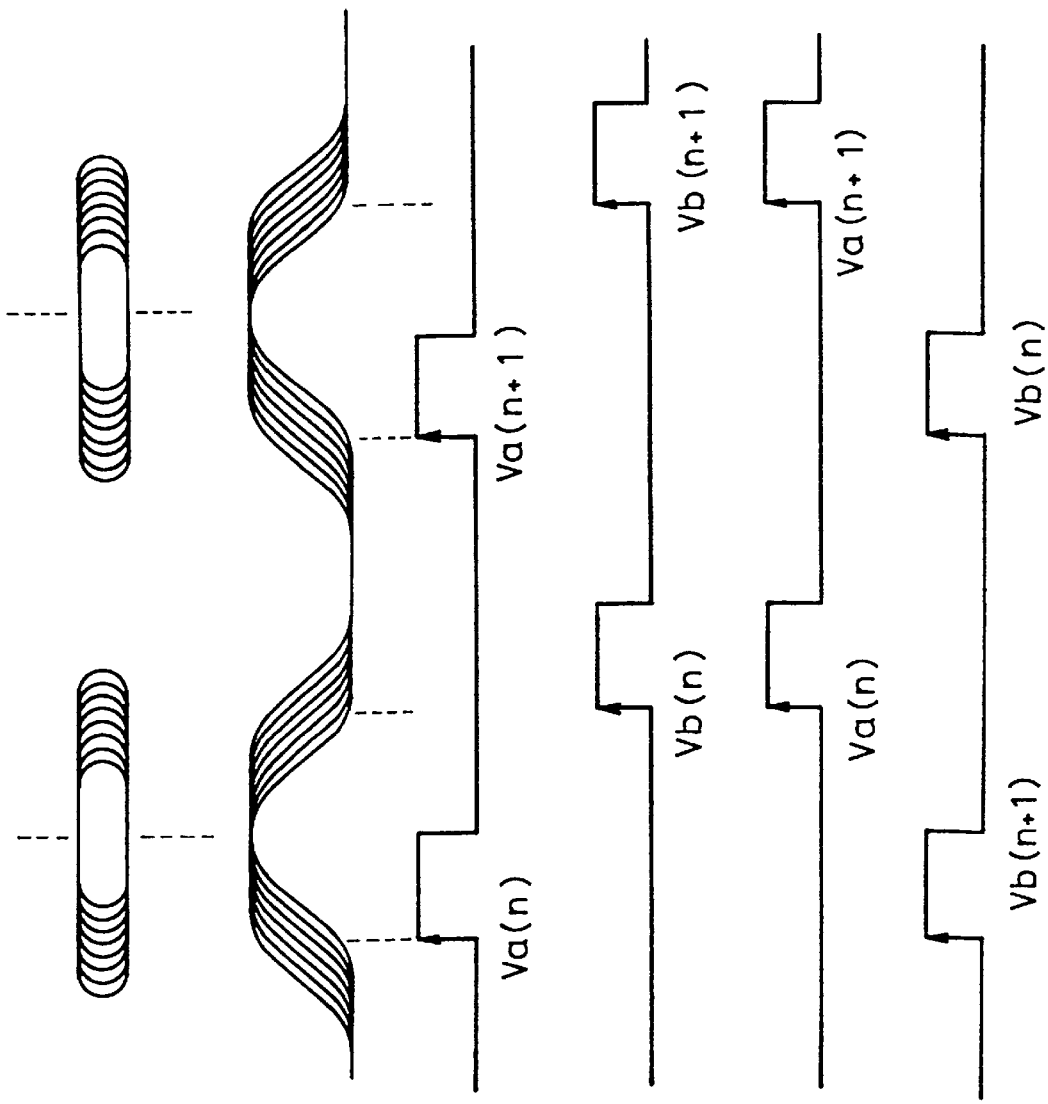
FIGS. 33A–33F are timing charts illustrating the operation in the data area of the embodiment shown in FIG. 24.

Operation of the data areas will now be described with reference to the timing chart shown in FIG. 33. The RF signal shown in FIG. 33B is generated in response to pit trains shown in FIG. 33A, and is input to the A/D converter circuit 109. The level of the RF signal generated in response to the front edge of each pit is sampled and converted into digital data in synchronism with the clock A (FIG. 33C) and the level of the RF signal generated in response to the rear edge is sampled and converted into digital data in synchronism with the clock B (FIG. 33D). As shown in FIGS. 33A and 33B, the phase of the RF signal changes in accordance with the position of the edge of the pit. Because the clocks A and B are generated at the time at which the RF signal level changes in response to the edges, the shift position of the edge can be detected from the difference in the level of the RF signal generated in response to the edge of the information pit and the level of the RF signal generated in response to the edge of the positional reference pit.

Returning now to FIG. 24, the digitally-represented level indicating the shift position of the front edge of the information pit latched in the latch circuit 131 by the clock signal A is supplied to the subtractor 142. The subtractor 142 subtracts from this level the level indicating the shift position (0) of the front edge of the position reference pit, which is latched in the latch circuit 141 by the clock signal RA, and feeds the resulting level difference to the RAM 123 as its high-order address (i.e., the abscissa address in FIG. 26). Similarly, the level indicating the shift position of the rear edge of the information pit latched in the latch circuit 132 by the clock signal B is supplied to the subtractor 144. The subtractor 144 subtracts from this level the level indicating the shift position (0) of the rear edge of the position reference pit, which is latched in the latch circuit 143 by the clock signal RB, and feeds the resulting level difference to the RAM 123 as its low-order address (i.e., the ordinate address in FIG. 26). The RAM 123 reads out the reference point stored at the storage location defined by this abscissa address and this ordinate address. Accordingly, the digital recording information ($a_n$, $b_n$) of the reference point that is closest to the information point is selected and then output as the reproduced digital recording information.

Returning now to FIG. 23, the 6-bit digital recording information ($a_n$, $b_n$) output from the two-dimensional decoder 111 are supplied to and converted into 8-bit words by the 6–8 bit converting circuit 112. More specifically, when an audio signal, for example, is recorded on the optical disk 101, the audio signal is subject to error correction in words of 8 bits. However, as described above, according to this embodiment, the digital recording information is recorded in each information pit in words of 6 bits, 3 bits (8 shift positions) being represented by the shift amount of the front edge and 3 bits (8 shift positions) being represented by the shift amount of the rear edge. When the audio signal is recorded, the incoming 8-bit words are converted into 6-bit words according to a predetermined scheme, and the resulting digital recording information is recorded on the optical disk 101. When the disk is reproduced, the 6–8 bit converting circuit 112 inversely converts the reproduced 6-bit words to the original 8-bit words. The 8-bit words inversely converted by the 6–8 bit converting circuit 112 are supplied to the error correction circuit 113, where they are subject to error correction. Then, following the error correction, the digital recording information is fed to the D/A converting circuit 114, where it is converted to an analog signal, which is then supplied to a loudspeaker, not shown, or other transducer.

Figure 36:
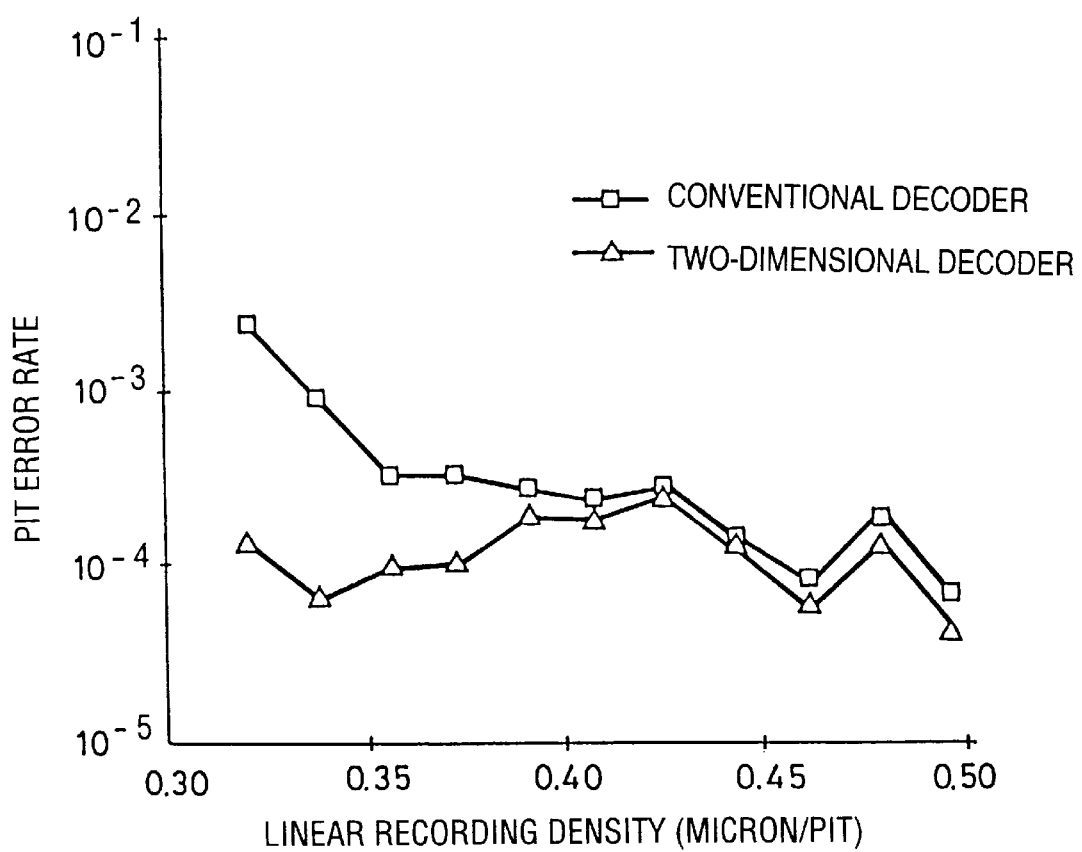
FIG. 36 shows the error rate realized by the embodiment shown in FIG. 24.

FIG. 36 shows the error rates of the digital recording information reproduced from the optical disk 101 by the reproducing system just described. It can be seen that, compared with a conventional reproducing system using a sawtooth wave, two-dimensional decoding carried out using reference points obtained by reproducing education pits and mapping the reference points in the RAM 123 provides a reduced error rate.

Figure 34:
FIG. 34 shows an example of an alternative arrangement of the information recording pits according to the invention.
Figure 35:
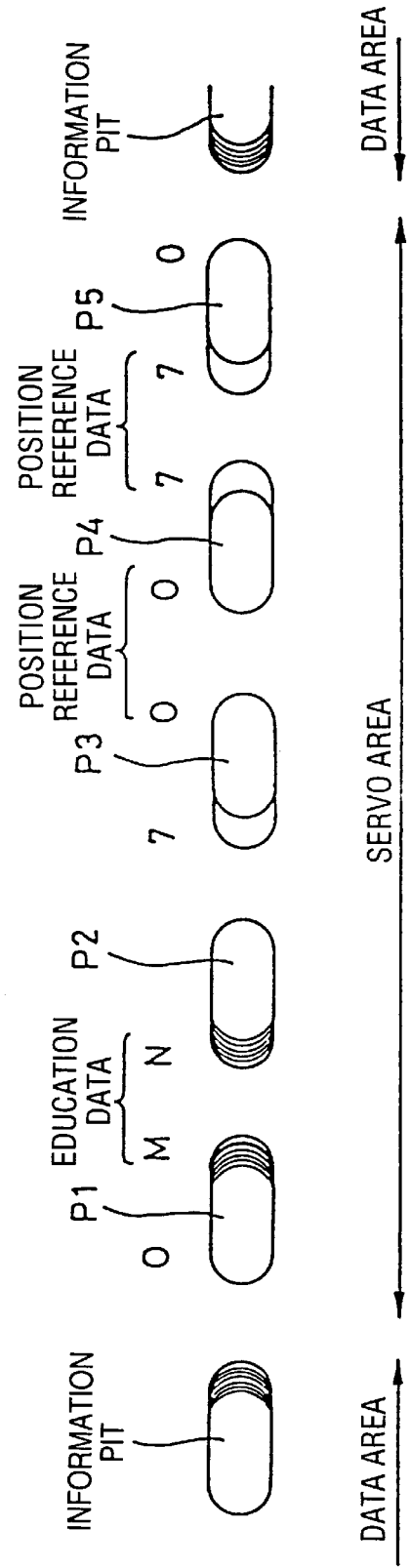
FIG. 35 shows an example of the arrangement of the servo area when the information recording pits are arranged as shown in FIG. 34.

While the front edge and the rear edge of each pit are paired and the digital recording information $a_n$ and $b_n$ are respectively recorded therein, as shown in FIG. 21 described above, the digital recording information $a_n$ and $b_n$ can alternatively be respectively recorded in the adjacent edges of adjacent pits as shown, for example, in FIG. 34. Also in this case, the education data and reference position data are each respectively recorded in the servo area in the adjacent edges of two adjacent pits, as shown in FIG. 35. In this embodiment, the education data (M, N) are respectively recorded in the adjacent edges of the adjacent education pits P1 and P2, and position reference data (0, 0) are recorded in the adjacent edges of the adjacent reference pits P3 and P4. In addition, the position reference data (7, 7) are respectively recorded in the adjacent edges of the adjacent reference pits P4 and P5.

In this case, as shown in FIGS. 33E and 33F, the clock signals A and B are respectively generated at the rear edge and the front edge of the pits.

The difference between the information point obtained by reproducing the information pit in the recording medium and the reference point obtained from the education data need not be stored in the RAM 123 in advance and may alternatively be calculated every time. However, if this is done, rapid decoding is difficult. Therefore, it is preferable to represent this difference data by mapping the information points in the RAM 123 in advance, as described above.

Figure 37:
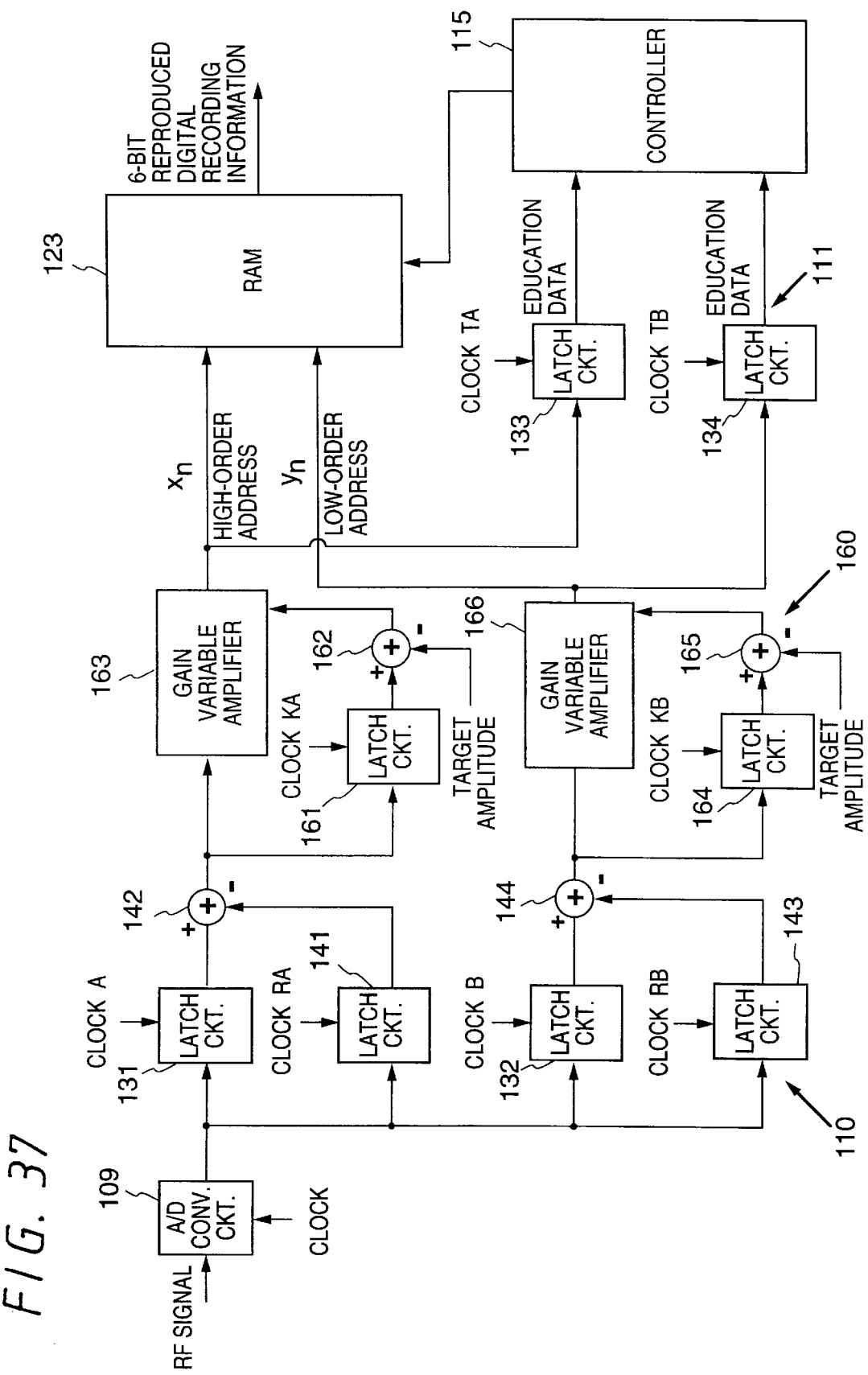
FIG. 37 is a block diagram showing the arrangement of another embodiment of the information reproducing apparatus according to the present invention.

While the bias eliminating circuit 110 is shown interposed between the A/D converter circuit 109 and the two-dimensional decoder 111 in the embodiment shown in FIG. 22, it is also possible to insert a gain adjusting circuit in addition to the bias eliminating circuit. FIG. 37 shows this variation incorporated in the second embodiment of the reproducing apparatus. In this variation, the output from the subtractor 142 is supplied to the variable gain amplifier 163, and is also supplied to the latch circuit 161, where it is latched at the timing of the clock KA. The output from the latch circuit 161 is supplied to the subtractor 162 which calculates the difference between it and a predetermined target amplitude. The output of the subtractor 162 is supplied to the variable gain amplifier 163.

Similarly, the output of the subtractor 144 is supplied to the variable gain amplifier 166 and is also supplied to the latch circuit 164, where it is latched at the timing of the clock KB. The output from the latch circuit 164 is supplied to the subtractor 165 which calculates the difference between it and a predetermined target amplitude. The output of the subtractor 165 is supplied to the variable gain amplifier 166.

The variable gain amplifiers 163 and 166 may be formed using a ROM, in which case, the outputs of the subtractors 142 and 162 (and/or the subtractors 144 and 165) are fed to this ROM as addresses, and data stored at the addresses are read out from the ROM.

The output of the variable gain amplifier 163 is supplied to the RAM 123 and the latch circuit 133, and the output of the variable gain amplifier 166 is supplied to the RAM 123 and the latch circuit 134. In other words, the gain adjusting circuit 160 is connected between the output of the bias eliminating circuit 110 and the two-dimensional decoder 111 (FIG. 22). The rest of the arrangement is similar to that shown in FIGS. 22 and 24.

The operation of the variation shown in FIG. 37 will be described with reference to the timing chart shown in FIG. 38. In the variation shown in FIG. 37, the education data are recorded in the adjacent edges of the adjacent education pits P1 and P2, as shown in FIG. 38A, unlike the embodiments shown in FIGS. 20 and 29. Further, the reference position data (0, 0) are recorded in the adjacent edges of the adjacent reference pits P3 and P4 and the reference position data (7, 7) are recorded in the adjacent edges of adjacent the reference pits P4 and P5.

The RF signal shown in FIG. 38B is obtained by reproducing the education pits P1 and P2 and the reference pits P3 to P5. The A/D converter circuit 109 converts the RF signal into digital data representing the level of the RF signal at the timing of the clock signal shown in FIG. 38C. The digitally-represented level data from the A/D converter are latched by the latch circuit 131 at the timing of the clock A (FIG. 38D), by the latch circuit 132 at the timing of the clock B (FIG. 38E), by the latch circuit 141 at the timing of the clock signal RA (FIG. 38F), and by the latch circuit 143 at the timing of the clock signal RB (FIG. 38G).

The output of the latch circuit 141 is subtracted from the output of the latch circuit 131 by the subtractor 142, and the output of the latch circuit 143 is subtracted from the output of the latch circuit 132 by the subtractor 144. As described above, the level differences determined by the subtractors are immune from the effects of the DC component so that the reference point (0, 0) can be disposed in the lattice shown in FIG. 26 at the point at which the broken straight lines cross each other.

The latch circuit 161 latches the output of the subtractor 142 at the timing of the clock RA (FIG. 38H). In other words, the latch circuit 161 latches the position reference data [7] recorded in the rear edge of the reference pit P4. The subtractor 162 subtracts the target amplitude from the output of the latch circuit 161 and supplies the resulting difference to the variable gain amplifier 163. The variable gain amplifier 163 adjusts the gain of the input it receives from the subtractor 142 in response to the output of the subtractor 162. Therefore, the position of the output of the variable gain amplifier 163 in the abscissa direction indicated by the reference point (7, 7) in FIG. 26 can be adjusted to set it to the target amplitude.

Similarly, the latch circuit 164 latches the output of the subtractor at the timing of the clock KB (FIG. 38I). The latch circuit 164 latches the position reference data [7] that is recorded in the front edge of the reference pit P6. The subtractor 165 subtracts the target amplitude from the data latched by the latch circuit 164 and supplies the resulting difference to the variable gain amplifier 166. The variable gain amplifier 166 adjusts the gain of the output it receives from the subtractor 144 in response to the output of the subtractor 165. Therefore, the position of the output of the variable gain amplifier 166 in the ordinate direction indicated by the reference point (7, 7) in FIG. 26 can be adjusted to set it to the target amplitude As described above, the gain is adjusted by the gain adjusting circuit 160, to set the position of the reference point (7, 7) shown in FIG. 26 to a predetermined position (i.e., to the position of the lattice point at which the broken straight lines cross each other in FIG. 26). Thus, even when the characteristics of the optical disk 101 vary depending on location on the disk, the digital recording information can be accurately read out from the disk.

Figure 39A:
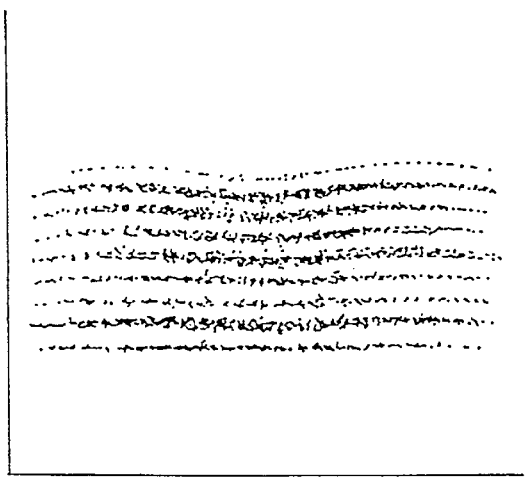
FIGS. 39A–39B show how the level of the reproduced signal changes with and without the variable gain amplifier shown in FIG. 37.
Figure 39B:
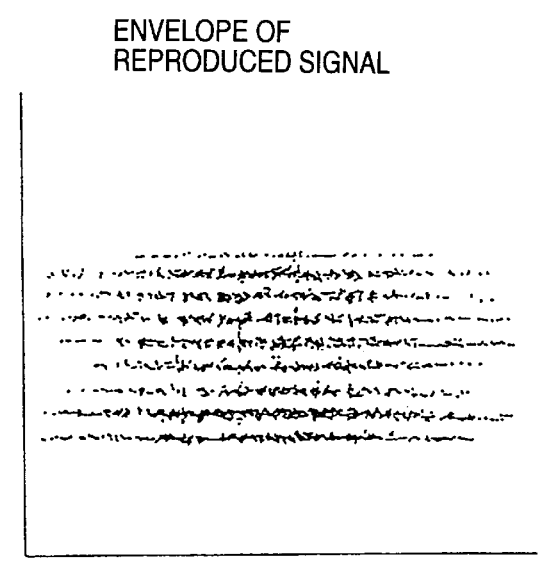

FIG. 39 shows the output of the variable gain amplifier 163 (or 166). FIG. 39A shows the output obtained when the output of the subtractor 162 is not supplied to the variable gain amplifier 163, and FIG. 39B shows the output obtained when the output is supplied to the variable gain amplifier 163. It can be seen that, when the gain is adjusted in response to the output of the subtractor 162, the variations in the output level are reduced.

Figure 40:
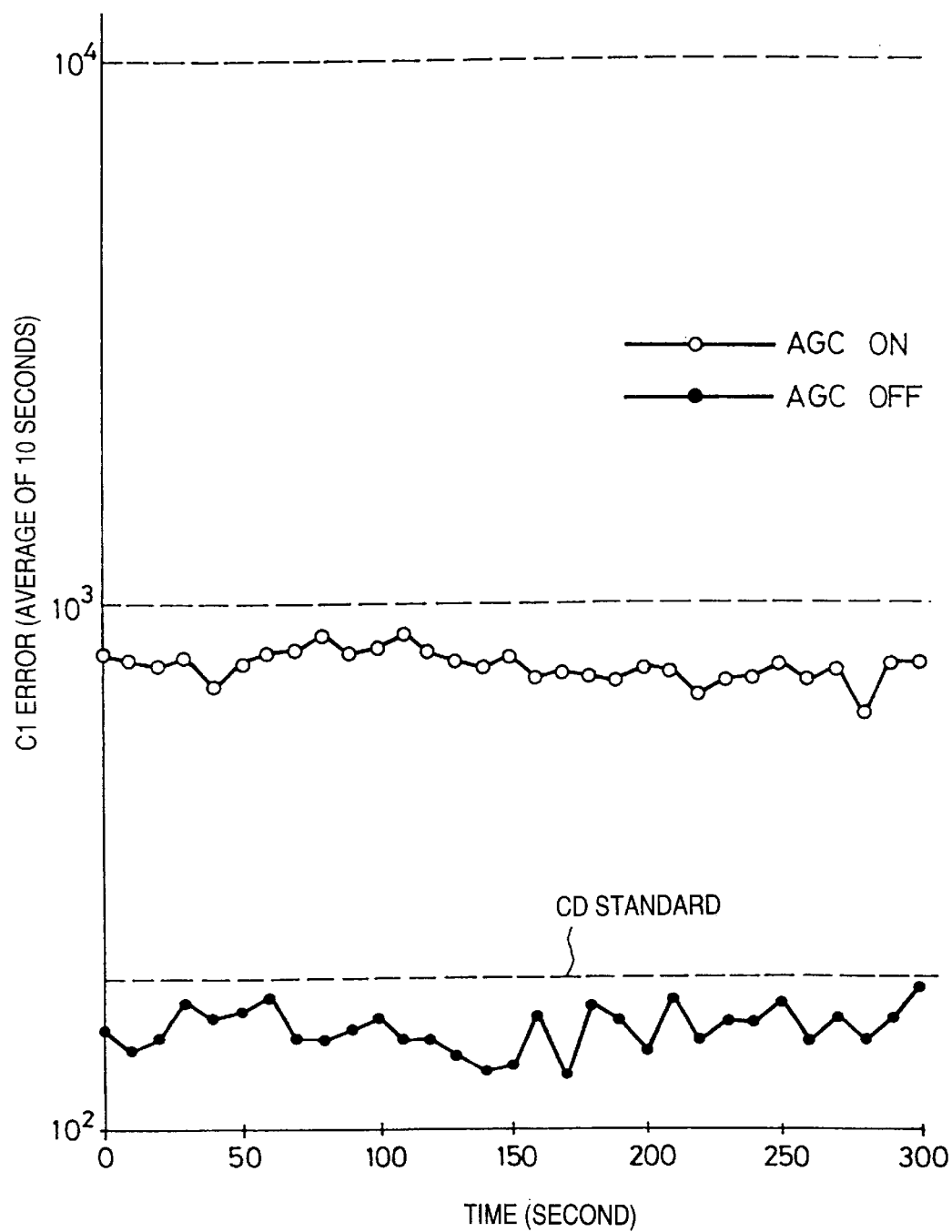
FIG. 40 shows the occurrence of errors realized by the embodiment shown in FIG. 37.

FIG. 40 shows the effect of controlling the gain on the number of C1 errors obtained when the error correction method used in the compact disc is applied in the embodiment of FIG. 37. In the figure, the open circles show the measured results obtained when the outputs of the subtractors 162 and 165 are not supplied to the variable gain amplifiers 163 and 166, respectively. The solid circles show the measured results obtained when the outputs of the latch circuits 141 and 143 are supplied to the subtractors 142 and 144, and the outputs of the subtractors 162 and 165 are also supplied to the variable gain amplifiers 163 and 166. It can be seen that the latter arrangement reduces the number of errors generated to a level that satisfies the CD standard.

As described above, the digital recording information recorded in the information pits is reproduced in response to the education data recorded in the education pits P1 and P2 and the positional reference data recorded in the reference pits P3 to P5. Accordingly, if a dropout, for example, occurs in these reference data, this reduces the accuracy with which the digital recording information recorded in the information pits is read. To prevent such impairment, the circuit arrangement can be made as shown, for example, in FIG. 41. More specifically, in this variation, the latch circuits 131 and 132 in FIG. 37 are replaced with the FIFOs 171 and 172 and the latch circuits 141 and 143 are replaced with the defect eliminating circuits 173 and 174. Further, the latch circuits 161 and 164 are replaced with the defect eliminating circuits 182 and 184, and the FIFOs 181 and 183 are inserted ahead of the inputs of the variable gain amplifiers 163 and 166. The rest of the arrangement is similar to that shown in FIG. 37.

Figure 42:
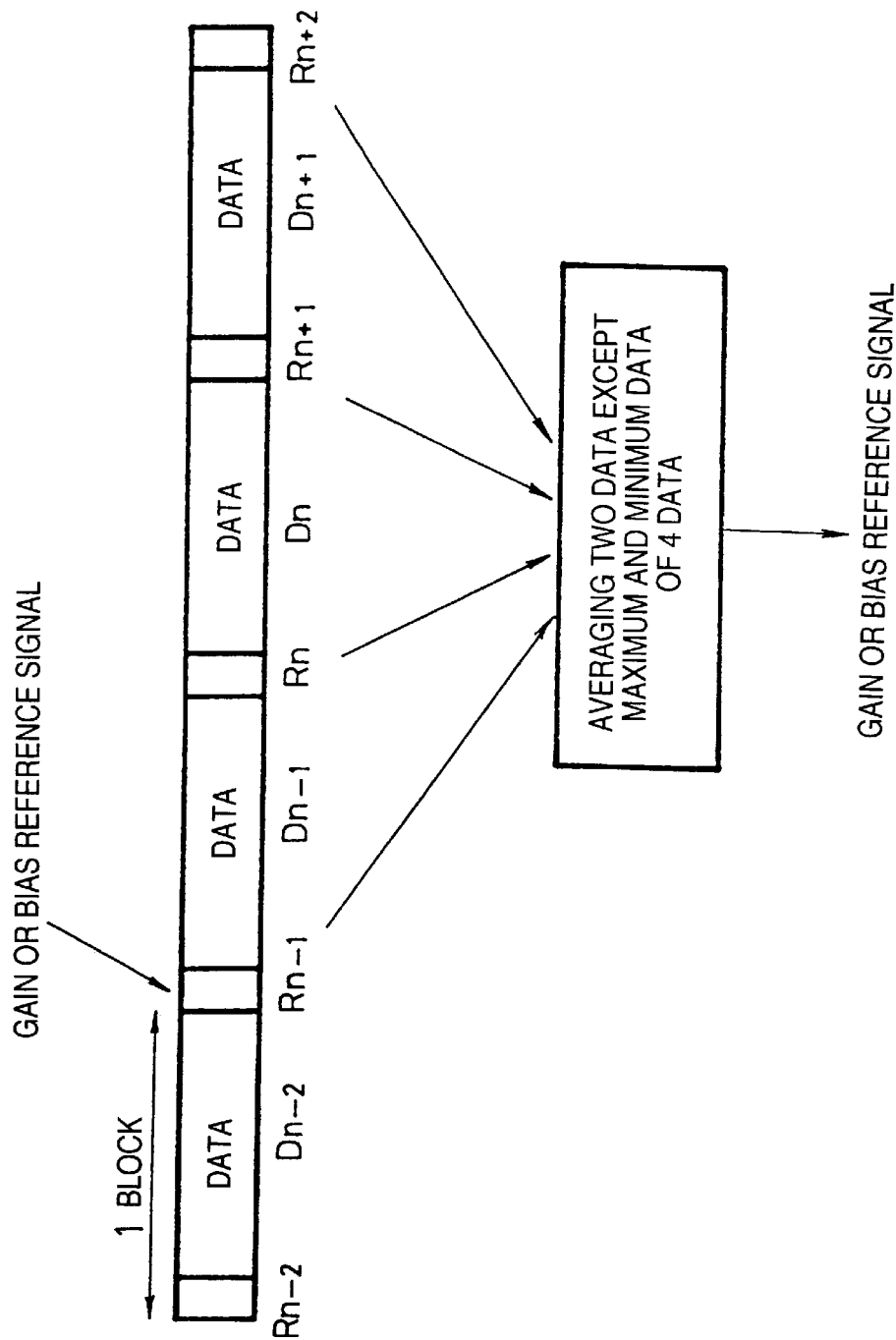
FIG. 42 illustrates the operation of the defect eliminating circuit shown in FIG. 41.

The defect eliminating circuit 173 stores 4 blocks of, for example, the digital level information it receives from the A/D converting circuit 109, as shown in FIG. 42. The position reference data (0, 0) of the four successive blocks are compared, the maximum and minimum position reference data are discarded, and the average of the remaining two position reference data is calculated and the average is used as the position reference data (0, 0). With the above-mentioned arrangement, even when the value of the position reference data (0, 0) is abnormal due to a dropout or the like, abnormal position reference data can be prevented from being used as the position reference data.

The other defect eliminating circuits 174, 182, and 184 operate similarly.

Because data of 4 blocks must be stored in the defect eliminating circuits 173, 174, 182, and 186, the FIFOs 171, 172, 181, and 183 are used to delay the latched data by a delay time corresponding the duration of four blocks before supplying the delayed data to the subtractors 142 and 144 and to the variable gain amplifiers 163 and 166.

Figure 43:
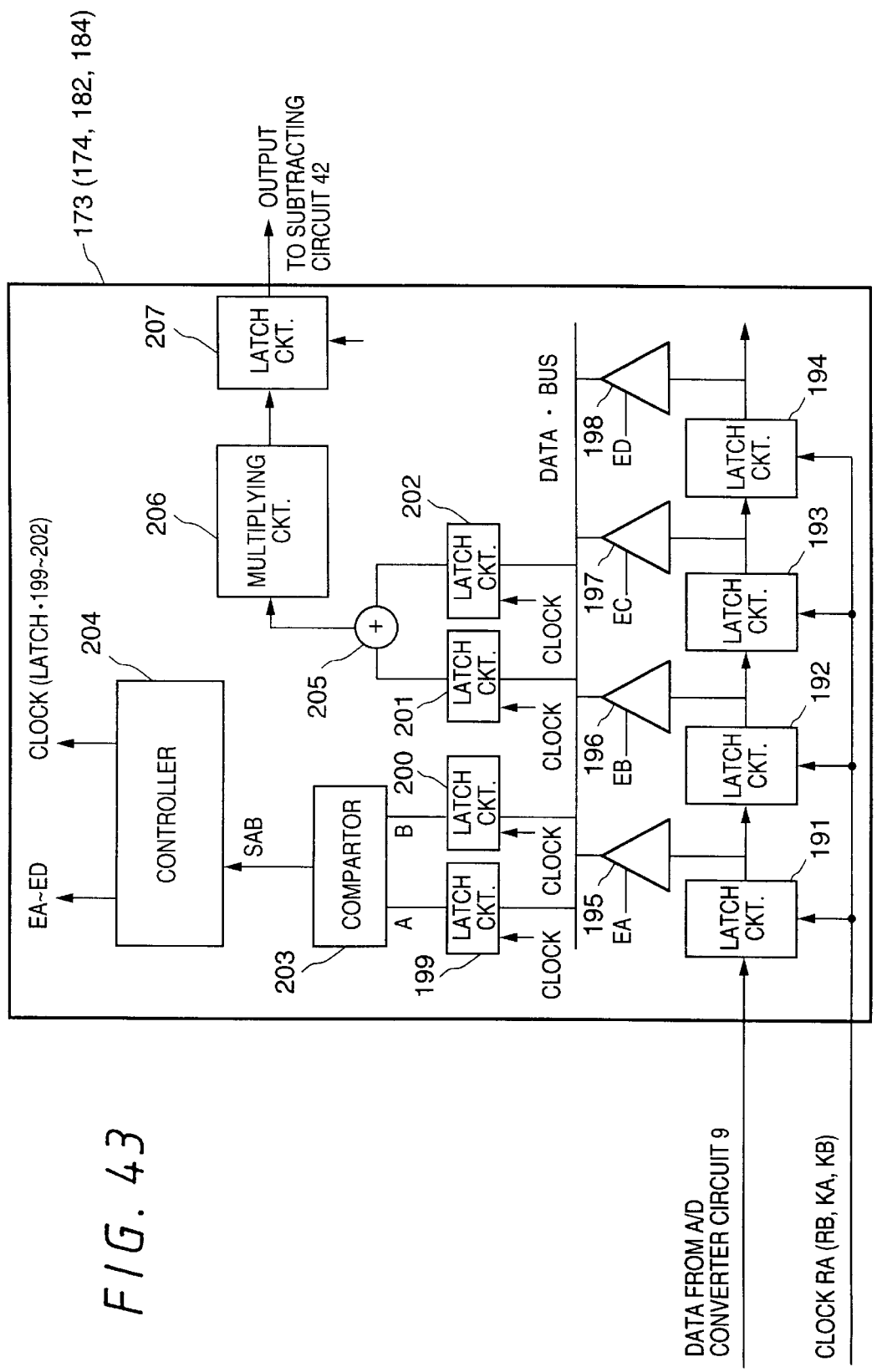
FIG. 43 is a block diagram showing an example of the arrangement of the defect eliminating circuit shown in FIG. 41.

FIG. 43 shows an example of the arrangement of the defect eliminating circuit 173, which generates one of the two positional reference data (0,0). The other defect eliminating circuits 174, 182, and 184 are similarly arranged. In the defect eliminating circuit 173, the level data received from the A/D converter circuit 109 are sequentially latched in the latch circuits 191 to 194 in synchronism with the clock RA. The level data thus latched in the latch circuits 191 to 194 are read out to the data bus when the gates 195 to 198 are turned on. The level data on the data bus are latched in the latch circuits 199 to 202 at a predetermined timing in synchronism with a clock output from the controller 204.

The level data latched in the latch circuits 199 and 200 are supplied to the comparator 203 which compares them. The comparator 203 supplies the signal SAB as the result of each comparison to the controller 204. The controller 204 feeds gate control signals EA, EB, EC, ED to the gates 195 to 198, respectively, to read the level data from the latches 191 to 194 onto the data bus, and also generates the clock signals that are fed to the latch circuits 199 to 202. Also, the controller operates according to the table shown in FIG. 44 to judge the maximum value and the minimum value of the data latched in the latch circuits 191 to 194 from the signals SAB it receives from the comparator 203.

The controller 204 sequentially generates the gate control signals EA to ED and the clock signals for the latch circuits 199 and 200 at a predetermined timing to cause the level data latched in two of the latch circuits 191 to 194 to be respectively fed via the data bus and to be latched in the latch circuits 199 and 200. The magnitudes of the two level data thus latched are compared by the comparator 203, which sets the state of the signal SAB depending on the result of the comparison. Repeating this processing a number of times enables the maximum value and the minimum value of the level data latched in the latch circuits 191 to 194 to be calculated.

FIG. 44 shows different pairs of the latched level data $R_{n-1}$ to $R_{n+2}$ in the top row. When the left-hand one of the data pairs is larger than the right-hand one, the left-hand one of the data pair is represented by logic level [1]. When it is smaller, the left-hand one is represented by logic level [0]. When the result is indefinite, the left-hand one is represented by X. For example, when the level data $R_{n-1}$ latched in the latch circuit 194 is larger than the level data $R_n$ latched in the latch circuit 193, and the level data $R_{n+1}$ latched in the latch circuit 194 is larger than the level data $R_{n-1}$ latched in the latch circuit 194, and the level data $R_{n-1}$ latched in the latch circuit 194 is larger than the level data $R_{n+2}$ latched in the latch circuit 191, the level data $R_{n-1}$ latched in the latch circuit 194 has the maximum value.

Further, when the level data $R_{n-1}$ is smaller than the level data $R_n$, and the level data $R_n$ is larger than the level data $R_{n+1}$, and the level data $R_n$ is larger than the level data $R_{n+2}$, then the level data $R_n$ has the maximum value.

Similarly, the maximum value and the minimum value of the level data are determined according to the comparison result patterns shown in FIG. 44.

When the controller 204 detects the maximum value and the minimum value of the level data $R_{n-1}$ to $R_{n+2}$ stored in the latch circuits 191 to 194 from the table shown in FIG. 44 as described above, the controller causes the level data other than the maximum and minimum data to be read out onto the data bus. These level data are latched in the latch circuits 201 and 202. Then, the level data latched in the latch circuits 201 and 202 are added by the adding circuit 205, multiplied by a coefficient of ½ by the multiplying circuit 206, and supplied to and latched in the latch circuit 207. That is to say, the latch circuit 207 latches the average value of the two of the level data $R_{n-1}$ to $R_{n+2}$ latched in the latch circuits 191 to 194 that are not the maximum value and the minimum value. This average of the level data is supplied to the subtractor 142 as one of the two positional reference data (0,0).

Figure 41:
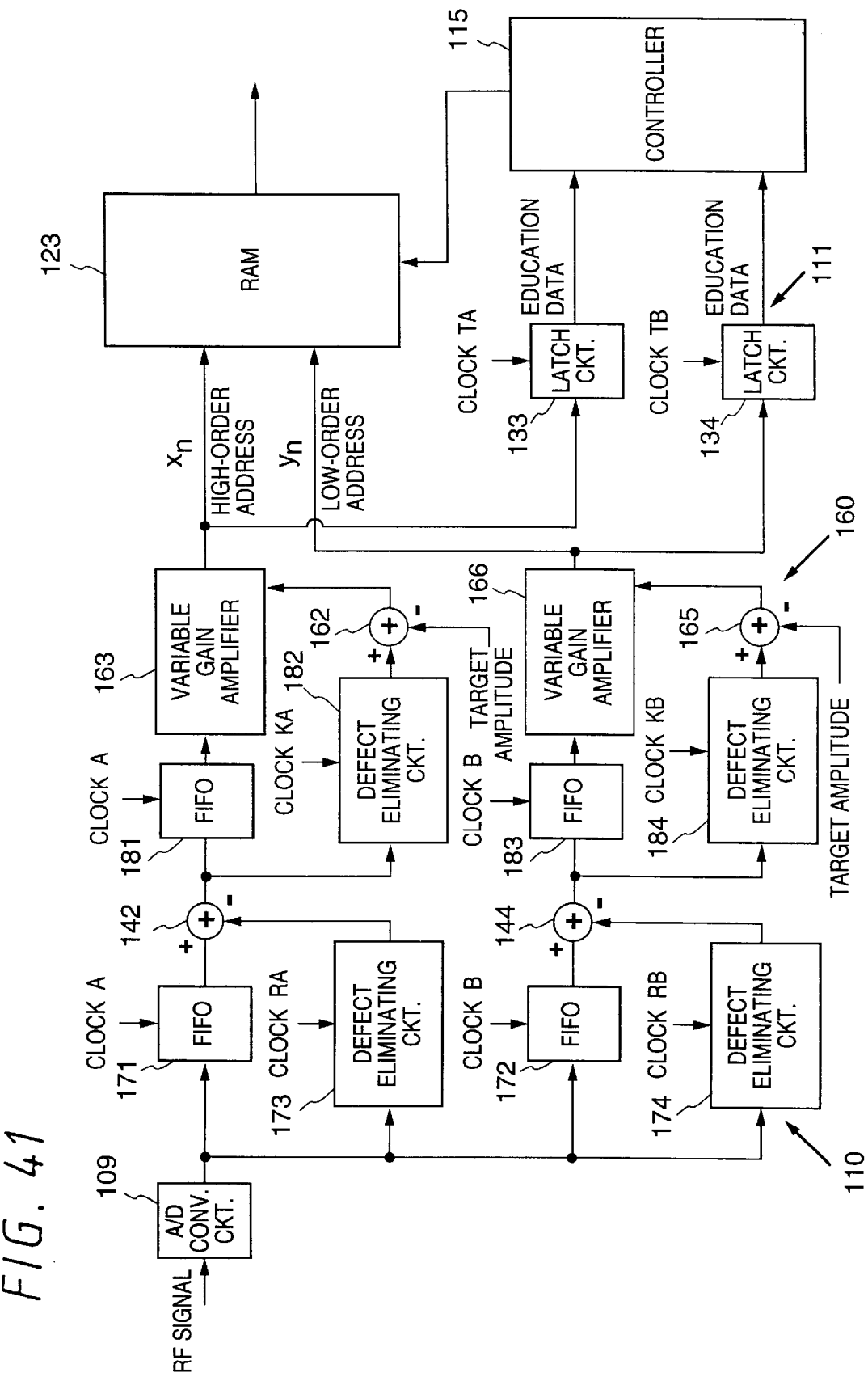
FIG. 41 is a block diagram showing the arrangement of a further embodiment of the information reproducing apparatus according to the present invention.
Figure 45:
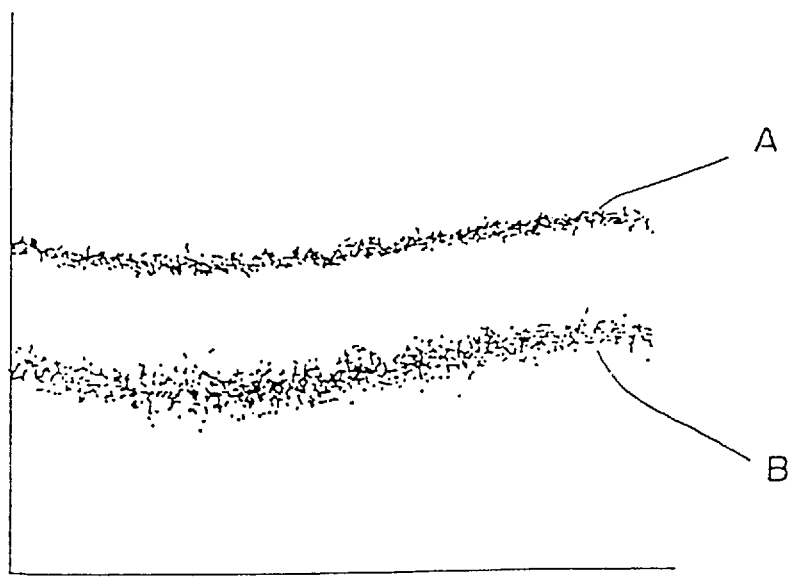
FIG. 45 shows the effect of defects on the reference level with (FIG. 45A) and without (FIG. 45B) the defect eliminating circuits shown in FIG. 41.

FIG. 45A shows measured variations in the reference level obtained when the defect eliminating circuits 173, 174, 182, 184 are used (shown by A in the figure) in FIG. 41 and when the defect eliminating circuits are not used (shown by B in the figure). When the defect eliminating circuits are not used, it can be seen that the level varies in response to defects caused by dropouts or the like. On the other hand, when the defect eliminating circuits are used, it can be seen that the effects of such defects are reduced, and the variation in the reference level is reduced. In other words, the defect eliminating circuits enable the digital recording information to be reproduced more accurately.

Figure 46:
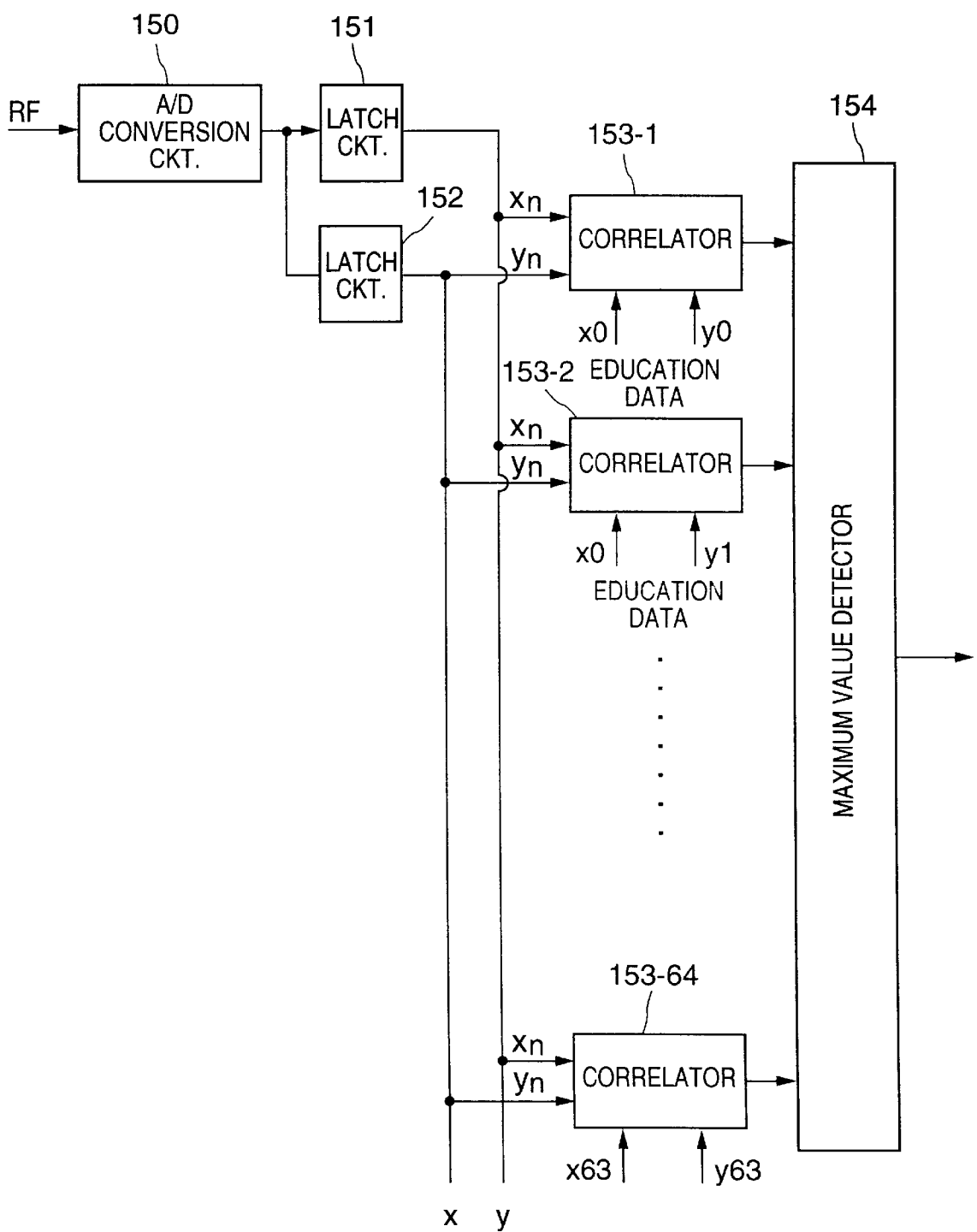
FIG. 46 is a block diagram showing an example of another arrangement for calculating the minimum distance between the education data and the reproduced data.

The minimum difference between the information point obtained by the reproducing the information pit data and the reference point set by the education data can be detected by the circuit arrangement shown in FIG. 46, for example.

In this embodiment, the reproduced RF signal is converted to digital level data by the A/D converter circuit 150 and the resulting level data latched by the latch circuits 151 and 152. The latch circuit 151 latches the level data corresponding to the front edge of the pit, for example, and the latch circuit 152 latches the level data corresponding to the rear edge of the pit. The level data latched by the latch circuits 151 and 152 are supplied to the 64 correlators 153-1 to 153-64. The correlators 153-1 to 153-64 are also each supplied with one of the 64 education data. Each of the correlators 153-1 to 153-64 calculates a correlation between the level data and the education data supplied from the latch circuits 151 and 152 and feeds the calculated result to the maximum value detector 154. The maximum value detector 154 is formed of a winner take all circuit, for example, and detects and outputs the maximum data of the 64 data it receives from the correlators 153-1 to 153-64.

While all the reference points are described above as being mapped in the RAM 123 in response to the education data, only some of the reference points (e.g., 16 reference points) may be mapped using the education data and the remaining reference points may be interpolated by calculation from the reference points mapped by the education data.

In information reproducing apparatus according to the present invention, since the position of the edge of the information pit is judged from the level of the signal reproduced from the information recording medium during the edge shift period, the arrangement of the apparatus can be simplified and the apparatus can be produced inexpensively.

In the information reproducing apparatus according to the present invention, since the edge position is judged from the information point defined by the level of the signal reproduced from the information recording medium when one and the other of adjacent edges are located at predetermined positions, the intersymbol interference can be suppressed and the recording density can be increased.

In the information reproducing apparatus according to the present invention, since the reference points are mapped in a memory, the position of the edge can be judged easily and quickly.

In the information reproducing apparatus according to the present invention, since the reference points are mapped using the education pits recorded on the information recording medium, the digital recording information can be read out accurately without being affected by variations in the information recording medium.

In the information reproducing apparatus according to the present invention, since some of the reference points can be obtained by calculation from the reference points defined by the education pits, the number of education pits recorded in the information recording medium can be reduced so that the capacity of the information recording medium can be utilized more effectively.

In the information reproducing apparatus according to the present invention, since the reproduced education pits can be checked for defects before they are used as education pits for mapping, the digital recording information can be reproduced without being affected by defects in the education pits.

In the information reproducing apparatus according to the present invention, the reference points are stored in a memory at storage points defined by addresses corresponding to the reproduced level of the education pit, which makes it possible to judge the reference point corresponding to the information point easily.

In the information reproducing apparatus according to the present invention, since the reference point stored at the storage point that is defined by the address corresponding to the reproduced level of each of the education pits is additionally copied to others of the storage points that are closest to the storage point defined by the address corresponding to the reproduced level of the education pit, the reference point corresponding to the information point can be judged quickly.

Further, in the information reproducing apparatus according to the present invention, since the memory is formed using RAM, the current arrangement of the apparatus can be simplified.

In the information reproducing apparatus according to the present invention, since the signal level reproduced in response to the position reference pit that has edges located at the shift position at which the shift amount is smallest is subtracted from the signal level reproduced in response to the information pits formed in the information recording medium, the digital recording information can be read out accurately without being affected by variations in the information recording medium or the like.

In the information reproducing apparatus according to the present invention, since the signal level reproduced in response to a reference pit that has edges located at the shift position at which the shift amount is largest is subtracted from the signal reproduced in response to the information pits formed in the information recording medium, the digital recording information can be read out accurately without being affected by the local variations in the characteristics of the information recording medium itself.

In the information reproducing apparatus according to the present invention, since the signal level corresponding to the reference pit that has edges located between the shift position at which the shift amount is smallest and the shift position at which the shift amount is largest is subtracted from the signal reproduced in response to the information pits formed in the information recording medium, the digital recording information can be read out accurately regardless of variations in individual information recording media and local fluctuations in the recording medium.

In the information recording medium according to the present invention, since education pits are formed in the information recording medium, the digital recording information data can be reproduced accurately without being affected by variations in the characteristics of the information recording medium and the reproducing apparatus.

In the information recording medium according to the present invention, since the education pits are recorded in a location removed from the information pits, the effect of the data recorded in the information pits on the education data recorded in the education pits is reduced.

In the information recording medium according to the present invention, since reference pits having an edge at the shift position at which the shift amount is smallest are recorded at predetermined positions removed from the information pits, it is possible to realize an information recording medium from which the digital recording information can be read out accurately even when variations occur between individual information recording media.

In the information recording medium according to the present invention, since reference pits having an edge at the shift position at which the shift amount is largest are recorded at predetermined positions removed from the information pits, it is possible to realize an information recording medium from which the digital recording information can be read out accurately even when the information recording medium has local variations in its characteristics.

In the recording medium according to the present invention, since reference pits having an edge at the shift position at which the shift amount is smallest and an edge at the shift position at which the shift amount is largest are recorded at predetermined positions remote from the information pits, it is possible to realize an information recording medium from which the digital recording information can be read out accurately regardless of individual variations and local variations.

We claim:

1. An information reproducing apparatus for reproducing digital information from an information recording medium having formed therein an information pit including one of a front edge and a rear edge in a position shifted in a step-wise fashion from a predetermined reference position by a shift amount representing the digital recording information, the apparatus comprising:

reproducing means for generating a signal in response to the information pit in the information medium;

reference edge detecting means for detecting the predetermine reference position of the one of the front edge and the rear edge of the information pit from the signal generated by the reproducing means;

edge shift detecting means, operating in response to the signal Generated by the reproducing means and in response to the predetermined reference position detected by the reference edge detecting means, for detecting the shift amount of the one of the front edge and the rear edge of the information pit from the predetermined reference position; and decoding means for decoding the digital recording information from the shift amount detected by the edge shift detecting means.

2. An information reproducing apparatus for reproducing digital recording information from an information recording medium having formed therein an information pit including one of a front edge and a rear edge in a position shifted in a step-wise fashion from a predetermined reference position by a shift amount representing the digital recording information, the information recording medium additionally having formed therein a position reference pit including a respective one of a front edge and a rear edge in a position indicating the predetermined reference position of the one of the front edge and the rear edge of the information pit, the information reproducing apparatus including:

reproducing means for generating a signal in response to the information pit and the position reference pit in the information recording medium;

reference edge detecting means, operating in response to the reproducing means, for detecting a position of the respective one of the front edge and the rear edge of the position reference pit;

information edge detecting means, operating in response to the reproducing means, for detecting the position of the one of the front edge and the rear edge of the information pit;

shift amount determining means for determining the shift amount of the position of the one of the front edge and the rear edge of the information pit detected by the information edge detecting means from the predetermined reference position indicated by the position of the respective one of the front edge and the rear edge of the reference pit detected by the reference edge detecting means; and decoding means for decoding the digital recording information from the shift amount determined by the shift amount determining means.

3. An information reproducing apparatus for reproducing digital recording information from an information recording medium having formed therein an information pit including one of a front edge and a rear edge in a position shifted in a step-wise fashion from a predetermined reference position by a shift amount representing the digital recording information, the information reproducing apparatus including:

reproducing means for generating a signal in response to the information pit in the information recording medium;

clock signal generating means for generating a clock signal synchronized with, and in phase with, the predetermined reference position;

level detecting means for detecting a level of the signal reproduced by the reproducing means in response to the one of the front edge and the rear edge of the information pit in the information recording medium at a timing indicated by the clock signal generating means;

shift amount determining means for determining the shift amount of the one of the front edge and the rear edge of the information pit from the level detected by the level detecting means; and decoding means for decoding the digital recording information from the shift amount determined by the shift amount determining means.

4. An information reproducing apparatus for reproducing digital recording information from an information recording medium having formed therein an information pit including one of a front edge and a rear edge in a position shifted in a step-wise fashion from a predetermined reference position by a shift amount representing the digital recording information, the information reproducing apparatus including:

reproducing means for generating a signal in response to the information recording medium, the signal having one or more levels; and shift amount determining means for determining the shift amount of the one of the front edge and the rear edge on the basis of an information point defined by the level of the signal reproduced by the reproducing means from the information recording medium in response to the information pit, and a reference point defined by the level of the signal reproduced by the reproducing means from the information recording medium in response to a front edge and a rear edge located at predetermined positions, the shift amount being determined for reproducing the recorded information.

5. The information reproducing apparatus according to claim 4, wherein:

the apparatus additionally comprises:

memory means, and mapping means for mapping in the memory means plural reference points for judging the shift amount corresponding to the information point, the plural reference points including the reference point; and means for identifying one of the plural reference points mapped in the memory means as corresponding to the information point because it is closest to the information point.

6. The information reproducing apparatus according to claim 5, wherein the information recording medium has additionally formed therein an education pit including the front edge and the rear edge in the predetermined position, and wherein:

the reproducing means reproduces the signal from the information recording medium in response to the education pit to define the reference point in the memory means is reproduced from said information recording medium; and the mapping means maps the reference point in the memory means in response to the signal reproduced by the reproducing means from the information recording medium in response to the education pit.

7. The information reproducing apparatus according to claim 6, wherein the mapping means includes means for calculating others of the plural reference points mapped in the memory means from the reference point defined by the signal reproduced by the reproducing means in response to the education pit.

8. The information reproducing apparatus according to claim 6 or 7, wherein the education pit is one of plural education pits formed in the information recording medium.

9. The information reproducing apparatus according to claim 6 or 7, wherein:

the memory means includes storage points, each of the storage points having an address, the address of one of the storage points corresponding to the level of the signal reproduced by the reproducing means from the information recording medium in response to the education pit; and the mapping means maps the reference point to the memory means at the one of the storage points.

10. The information reproducing apparatus according to claim 9, wherein the mapping means maps the reference point to selected others of the storage points in the memory means in addition to mapping the reference point to the one of the storage points.

11. The information reproducing apparatus according to claim 5, wherein the memory means includes a RAM.

12. The information reproducing apparatus according to claim 4, wherein the information recording medium additionally has formed therein a reference pit including a front edge and a rear edge, and wherein:

the apparatus additionally comprises means for subtracting the signal reproduced from the information recording medium by the reproducing means in response to the reference pit from the signal reproduced from the information recording medium by the reproducing means in response to the information pit.

13. The information reproducing apparatus according to claim 12, wherein at least one of the front edge and the rear edge of the reference pit is located at a position corresponding to a maximum shift amount of the front edge and the rear edge of the information pit.

14. The information reproducing apparatus according to claim 12, wherein:

the reference pit includes a first reference pit, including a first front edge and a first rear edge, and a second reference pit, including a second front edge and a second rear edge;

one of the first front edge and the second front edge is located at a position corresponding to the reference position of the information pit; and one of the first rear edge and the second rear edge is located at a position corresponding to a maximum shift amount of the information pit.

15. The information reproducing apparatus according to claim 12, wherein at least one of the front edge and the rear edge of the reference pit is located at a position corresponding to the reference position of the information pit.

* * * * *

UNITED STATES PATENT AND TRADEMARK OFFICE
CERTIFICATE OF CORRECTION

PATENT NO. : 5,818,805
DATED : October 6, 1998
INVENTOR(S) : Seiji Kobayashi, et. al.

It is certified that error appears in the above-identified patent and that said Letters Patent is hereby corrected as shown below:

At *Column 31, lines 29 to 30:* After the word "means", delete

"is reproduced from said information recording medium"

Signed and Sealed this

Ninth Day of March, 1999

Attest:

Q. TODD DICKINSON

Attesting Officer

Acting Commissioner of Patents and Trademarks